(12) United States Patent
Finn, II et al.

(10) Patent No.: US 11,159,386 B2
(45) Date of Patent: Oct. 26, 2021

(54) ENRICHED FLOW DATA FOR NETWORK ANALYTICS

(71) Applicant: Cisco Technology, Inc., San Jose, CA (US)

(72) Inventors: Matthew Lawson Finn, II, Woodstock, GA (US); Alok Lalit Wadhwa, Milpitas, CA (US); Navindra Yadav, Cupertino, CA (US); Jerry Xin Ye, Brooklyn, NY (US); Supreeth Rao, Cupertino, CA (US); Prasannakumar Jobigenahally Malleshaiah, Sunnyvale, CA (US); Tapan Shrikrishna Patwardhan, Mountain View, CA (US); Umamaheswaran Arumugam, San Jose, CA (US); Aiyesha Ma, San Francisco, CA (US); Darshan Shrinath Purandare, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/354,008

(22) Filed: Mar. 14, 2019

(65) Prior Publication Data
US 2020/0296007 A1 Sep. 17, 2020

(51) Int. Cl.
*H04L 12/24* (2006.01)
*H04L 12/26* (2006.01)

(52) U.S. Cl.
CPC .......... *H04L 41/145* (2013.01); *H04L 43/045* (2013.01)

(58) Field of Classification Search
CPC ............................ H04L 41/145; H04L 43/045
See application file for complete search history.

(56) References Cited

U.S. PATENT DOCUMENTS 7,583,593 B2 * 9/2009 Guichard ............ H04L 41/0677
370/225
9,813,340 B2 * 11/2017 Thubert ................ H04L 47/125
(Continued)

OTHER PUBLICATIONS

Zhang, L., Liu, Q., Zhang, J., Wang, H., Pan, Y., & Yu, Y. (2007). Semplore: an IR approach to scalable hybrid query of semantic web data. In The Semantic Web (pp. 652-665). Springer, Berlin, Heidelberg.*
(Continued)

*Primary Examiner* — Sarah Lhymn
(74) *Attorney, Agent, or Firm* — Polsinelli

(57) ABSTRACT

Systems and methods provide for enriching flow data to analyze network security, availability, and compliance. A network analytics system can capture flow data and metadata from network elements. The network analytics system can enrich the flow data by in-line association of the flow data and metadata. The network analytics system can generate multiple planes with each plane representing a dimension of enriched flow data. The network analytics system can generate nodes for the planes with each node representing a unique value or set of values for the dimensions represented by planes. The network analytics system can generate edges for the nodes of the planes with each edge representing a flow between endpoints corresponding to the nodes. The network analytics system can update the planes in response to an interaction with the planes or in response to a query.

20 Claims, 10 Drawing Sheets

(56) References Cited

U.S. PATENT DOCUMENTS

| | | | | |
|---|---|---|---|---|
| 2008/0276201 | A1* | 11/2008 | Risch | G06F 16/34 |
| | | | | 715/853 |
| 2012/0072887 | A1* | 3/2012 | Basak | G06F 11/323 |
| | | | | 717/123 |
| 2012/0113817 | A1* | 5/2012 | Fitzgerald | H04L 43/10 |
| | | | | 370/248 |
| 2017/0006497 | A1* | 1/2017 | Thubert | H04L 47/125 |

OTHER PUBLICATIONS

Uddin, M., Stadler, R., & Clemm, A. (2018). A bottom-up design for spatial search in large networks and clouds. International Journal of Network Management, 28(6), e2041, pp. 1-20.*

Uddin, M., & Stadler, R. (Apr. 2016). A bottom-Up approach to real-time search in large networks and clouds. In NOMS 2016-2016 IEEE/IFIP Network Operations and Management Symposium (pp. 985-990). IEEE.*

Cicsco Live Presentation (2018, Barcelona) (available at: https://www.ciscolive.com/c/dam/r/ciscolive/emea/docs/2018/pdf/BRKSDN-2901.pdf), pp. 1-55.*

Kodeswaran, S. B., & Joshi, A. (Apr. 2006). Content and context aware networking using semantic tagging. In 22nd International Conference on Data Engineering Workshops (ICDEW'06) (pp. 77-77). IEEE.*

\* cited by examiner

ENRICHED FLOW DATA FOR NETWORK ANALYTICS

TECHNICAL FIELD

The subject matter of this disclosure relates in general to the field of computer networks, and more specifically for systems and methods for enriching flow data to analyze network security, availability, and compliance.

BACKGROUND

A conventional network flow can be characterized as a set of packets sharing certain header values that are sent within a network within a specified period of time. These packet header values can include a network source address (e.g., Internet Protocol (IP) address, Media Access Control (MAC) address, etc.), source port, destination address, destination port, protocol type, class of service, and so forth. The network source address may correspond to a first endpoint (e.g., server, workstation, desktop computer, laptop computer, tablet, mobile phone, desk phone, wearable device, or other electronic device) of the network, and the network destination address may correspond to a second endpoint of the network. Conventional network flow data may occasionally be collected when a switch or a router forwards a packet, and thus, a switch or router interface can also be an attribute used to distinguish network flows. Very little else may be known about each network flow, such as its geographical source or destination, associated data center, associated networking device versions, associated applications, and so forth.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
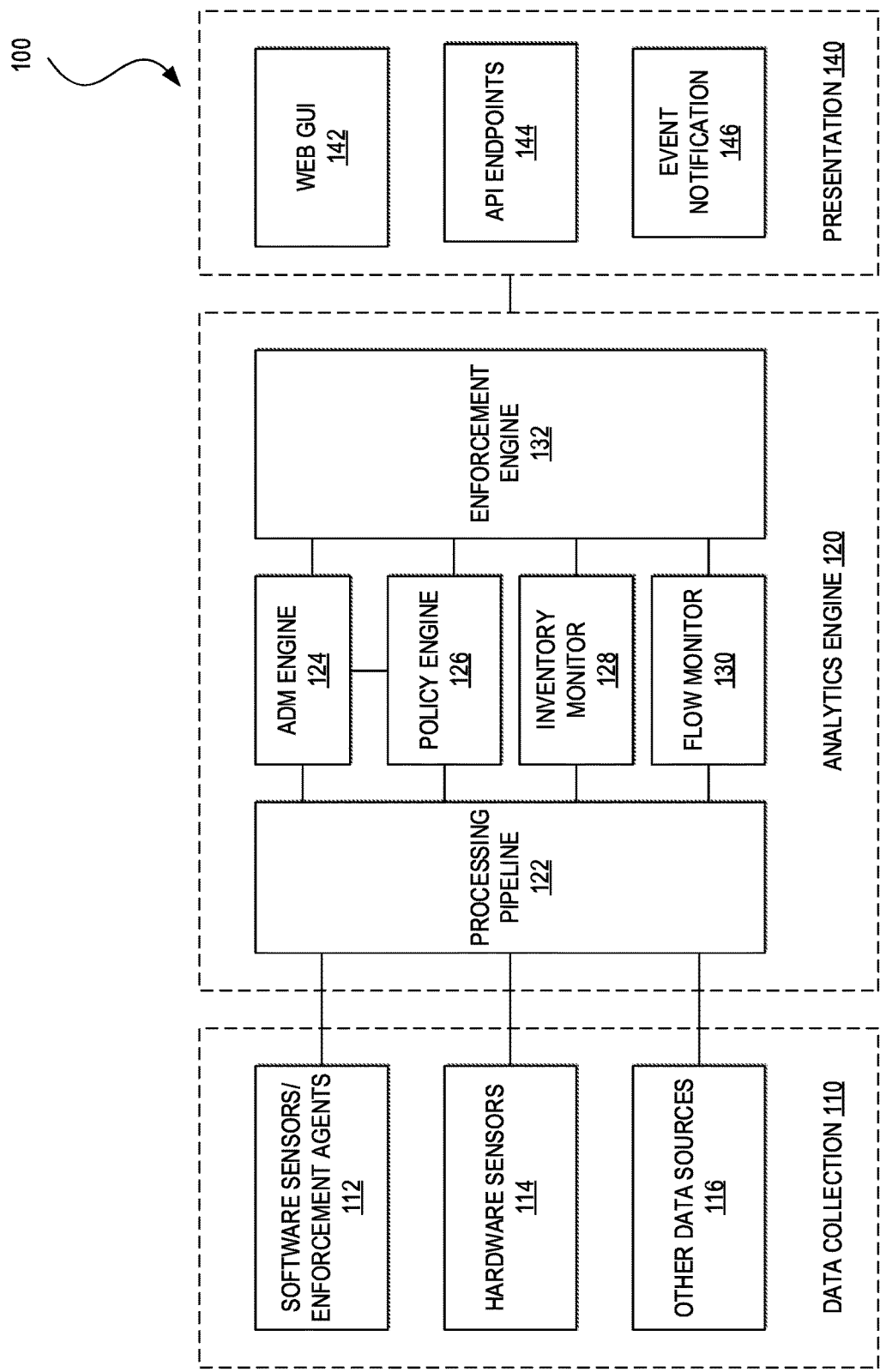
FIG. 1 illustrates a block diagram of an example of a network analytics system in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for enriching flow data to analyze network security, availability, and compliance. A network analytics system can capture flow data and metadata from network elements. The network analytics system can enrich the flow data by associating the flow data and metadata in-line with the capture of the flow data and metadata. The network analytics system can generate multiple planes with each plane representing one or more dimensions of enriched flow data. The network analytics system can generate one or more nodes for one or more of the planes with each node representing one or more values for the dimensions each represented by the one or more planes. The network analytics system can generate one or more edges for the nodes of the one or more planes with each edge representing a flow between endpoints corresponding to the nodes. The network analytics system can update one or more of the planes in response to an interaction with one or more of the planes or in response to a query.

DESCRIPTION

Enterprise networks are becoming increasingly opaque due to virtualization, fabric overlays, and hybrid cloud computing, among other phenomena. This opacity can make network troubleshooting and management challenging, and it can also make protecting the network complex even for experienced security experts. In addition, traffic patterns in the enterprise network continue to evolve, with orders of magnitude increases in traffic volume and the number of processes executed by network infrastructure. Collecting and analyzing detailed telemetry information may be critical for troubleshooting and providing security for enterprise networks.

Current approaches for capturing and analyzing telemetry may no longer be adequate in view of the many challenges networks may face today. Conventional telemetry can obtain de minimis network traffic information, such as limited knowledge of the who (e.g., source or destination IP addresses), what (e.g., IP protocol or IP Type of Service (TOS)), where (e.g., source and destination ports), and when (e.g., flow start and finish time) of a flow but cannot provide, at greater depth, the who (e.g., user, role or group, tenant, business unit, etc.), what (e.g., the physical server, virtual machine, container, other virtual server, application, process, or other system generating the traffic, including the identities of these network elements, the resources consumed by these elements), where (e.g., geographic location, building, room, rack, etc.), and when (e.g., fine-grain temporal distribution of packets) nor the why (e.g., policies) and how (e.g., cloud information, tunnel endpoint identifiers and other network stenography, network operating system, etc.). In addition, conventional flows cannot readily provide information over the life of the flow (e.g., deviation from past behavior, expected future behavior, etc.). That is, conventional techniques may be focused on describing network flows but cannot describe the systems that generated the flows. Consequently, conventional flow records require additional data processing and storage before the latter type of information is available.

Another limitation of conventional telemetry can be its reliance on sampling, which can increase the likelihood that malicious activity occurring between samples may go undetected. Sampling may be suitable for understanding the kind or volume of traffic that is flowing but may not be useful when the objective is to detect anomalous behavior or to gain a full view of the network. Sampling can be highly dependent on the intelligence of the collector and the quality of samples (e.g., entropy and size of flows). Sampling can also prevent proper flow tracking for connection-oriented protocols because when packets are randomly selected, consistent tracking of Transmission Control Protocol (TCP) flags or IP options may not be guaranteed.

Conventional telemetry typically involves capture of full packets or headers. This can consume a significant amount of Central Processing Unit (CPU), memory, storage, and bandwidth for tracking and exporting flows. In addition, full packet or header capture can raise privacy concerns. For example, headers may vary in size and capture can occur at constant size. If the network is configured to capture encapsulated packet headers, there may be a risk of copying a portion of the payload for other traffic.

Various embodiments of the present disclosure may overcome these and other deficiencies of the prior art for collecting telemetry. In some embodiments, a network analytics system can capture and annotate contextual information regarding network traffic (e.g., enrich the flow data with information outside of the flow domain) using hardware assistance. The network analytics system can provide additional insight and visibility into the network from the enriched flow data while avoiding over-extending finite computing resources. The network analytics system can discover system dependencies through the enriched flow data, and generate backward-looking and forward-looking visualizations and support interactions for a more intuitive and deeper understanding of how different network elements (e.g., network devices, endpoints, applications, services, flows, policies, etc.) may interrelate. For example, the network analytics system can conduct fault injection analysis or what-if analysis to show the cascading impact of certain events. Numerous other functions and advantages are described and suggested below as may be provided in accordance with the various embodiments.

FIG. 1 illustrates a block diagram of an example of a network analytics system 100. In some embodiments, the network analytics system 100 can be implemented using Cisco Tetration Analytics™. However, one skilled in the art will understand that FIG. 1 (and generally any system discussed in this disclosure) is but one possible embodiment of a network analytics system and that other embodiments can include additional, fewer, or alternative components arranged in similar or alternative orders, or in parallel, unless otherwise stated. In this example, the network analytics system 100 includes a data collection layer 110, an analytics engine 120, and a presentation layer 140.

The data collection layer 110 may include software sensors 112, hardware sensors 114, and other data sources 116. The software sensors 112 can run within servers of a network, such as physical or bare-metal servers; hypervisors, virtual machine monitors, container orchestrators, or other virtual entity managers; virtual machines, containers, or other virtual entities. The hardware sensors 114 can reside on the Application-Specific Integrated Circuits (ASICs) or Field Programmable Gate Arrays (FPGAs) of switches, routers, or other network devices (e.g., Packet Capture (PCAP) appliances such as a standalone packet monitor, a device connected to a network device's monitoring port, a device connected in series along a main trunk of a data center, or similar device). The software sensors 112 can capture telemetry from servers (e.g., flow data, server data, process data, user data, policy data, etc.) and the hardware sensors 114 can capture network telemetry from network devices, and send the telemetry to the analytics engine 120 for further processing. For example, the software sensors 112 can sniff packets sent over their hosts' physical or virtual network interface cards (NICs), or individual processes on each server can report the telemetry to the software sensors 112. The hardware sensors 114 can capture network telemetry at line rate from all ports of the network devices hosting the hardware sensors.

Figure 2:
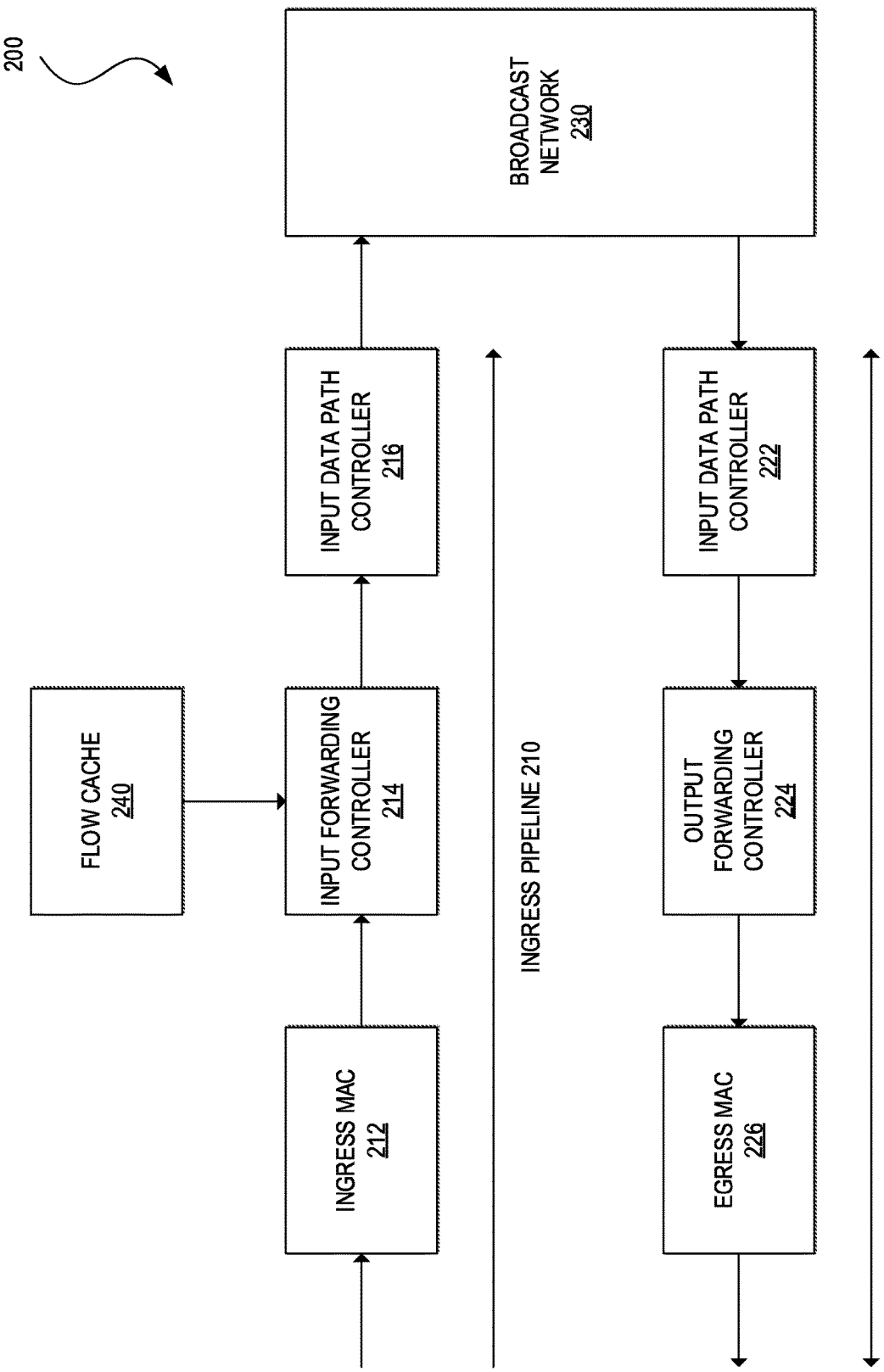
FIG. 2 illustrates a block diagram of an example of a forwarding pipeline of an Application-Specific Integrated Circuit (ASIC) of a network device in accordance with an embodiment.

FIG. 2 illustrates a block diagram of an example of a unicast forwarding pipeline 200 of an ASIC for a network device that can capture network telemetry at line rate with minimal impact on the CPU. In some embodiments, one or more network devices may incorporate the Cisco® ASE2 or ASE3 ASICs for implementing the forwarding pipeline 200. For example, certain embodiments can include one or more Cisco Nexus® switches that utilize the ASE2 or ASE3 ASICs or equivalent ASICs. The ASICs may have multiple slices (e.g., the ASE2 and ASE3 have six slices and two slices, respectively) in which each slice can represent a switching subsystem with both an ingress forwarding pipeline 210 and an egress forwarding pipeline 220. The ingress forwarding pipeline 210 can include an Input/Output (I/O) component, ingress MAC 212; an input forwarding controller 214; and an input data path controller 216. The egress forwarding pipeline 220 can include an output data path controller 222, an output forwarding controller 224, and an I/O component, egress MAC 226. The slices may connect to a broadcast network 230 that can provide point-to-multipoint connections from each slice and all-to-all connectivity between slices. The broadcast network 230 can provide enough bandwidth to support full-line-rate forwarding between all slices concurrently. When a packet enters a network device, the packet goes through the ingress forwarding pipeline 210 of the slice on which the port of the ingress MAC 212 resides, traverses the broadcast network 230 to get onto the egress slice, and then goes through the egress forwarding pipeline 220 of the egress slice. The input forwarding controller 214 can receive the packet from the port of the ingress MAC 212, parse the packet headers, and perform a series of lookups to determine whether to forward the packet and how to forward the packet to its intended destination. The input forwarding controller 214 can also generate instructions for the input data path controller 216 to store and queue the packet. In some embodiments, the network device may be a cut-through switch such that the network device performs input forwarding while storing the packet in a pause buffer block (not shown) of the input data path controller 216.

As discussed, the input forwarding controller 214 may perform several operations on an incoming packet, including parsing the packet header, performing an L2 lookup, performing an L3 lookup, processing an ingress access control list (ACL), classifying ingress traffic, and aggregating forwarding results. Although describing the tasks performed by the input forwarding controller 214 in this sequence, one of ordinary skill will understand that, for any process discussed herein, there can be additional, fewer, or alternative steps performed in similar or alternative orders, or in parallel, within the scope of the various embodiments unless otherwise stated.

In some embodiments, when a unicast packet enters through a front-panel port (e.g., a port of ingress MAC 212), the input forwarding controller 214 may first perform packet header parsing. For example, the input forwarding controller 214 may parse the first 128 bytes of the packet to extract and save information such as the L2 header, EtherType, L3 header, and TCP IP protocols.

As the packet goes through the ingress forwarding pipeline 210, the packet may be subject to L2 switching and L3 routing lookups. The input forwarding controller 214 may first examine the destination MAC address of the packet to determine whether to switch the packet (e.g., an L2 lookup) or route the packet (e.g., an L3 lookup). For example, if the destination MAC address matches the network device's own MAC address, the input forwarding controller 214 can perform an L3 routing lookup. If the destination MAC address does not match the network device's MAC address, the input forwarding controller 214 may perform an L2 switching lookup based on the destination MAC address to determine a Virtual Local Area Network (VLAN) identifier. If the input forwarding controller 214 finds a match in the MAC address table, the input forwarding controller 214 can send the packet to the egress port. If there is no match for the destination MAC address and VLAN identifier, the input forwarding controller 214 can forward the packet to all ports in the same VLAN.

During L3 routing lookup, the input forwarding controller 214 can use the destination IP address for searches in an L3 host table. This table can store forwarding entries for directly attached hosts and learned/32 host routes. If the destination IP address matches an entry in the host table, the entry will provide the destination port, next-hop MAC address, and egress VLAN. If the input forwarding controller 214 finds no match for the destination IP address in the host table, the input forwarding controller 214 can perform a longest-prefix match (LPM) lookup in an LPM routing table.

In addition to forwarding lookup, the input forwarding controller 214 may also perform ingress ACL processing on the packet. For example, the input forwarding controller 214 may check ACL ternary content-addressable memory (TCAM) for ingress ACL matches. In some embodiments, each ASIC may have an ingress ACL TCAM table of 4000 entries per slice to support system internal ACLs and user-defined ingress ACLs. These ACLs can include port ACLs, routed ACLs, and VLAN ACLs, among others. In some embodiments, the input forwarding controller 214 may localize the ACL entries per slice and program them only where needed.

In some embodiments, the input forwarding controller 214 may also support ingress traffic classification. For example, from an ingress interface, the input forwarding controller 214 may classify traffic based on the address field, Institute of Electrical and Electronics Engineers (IEEE) 802.1q Class of Service (CoS), and IP precedence or differentiated services code point in the packet header. In some embodiments, the input forwarding controller 214 can assign traffic to one of eight quality-of-service (QoS) groups. The QoS groups may internally identify the traffic classes used for subsequent QoS processes as packets traverse the system.

In some embodiments, the input forwarding controller 214 may collect the forwarding metadata generated earlier in the pipeline (e.g., during packet header parsing, L2 lookup, L3 lookup, ingress ACL processing, ingress traffic classification, forwarding results generation, etc.) and pass it downstream through the input data path controller 216. For example, the input forwarding controller 214 can store a 64-byte internal header along with the packet in the packet buffer. This internal header can include 16 bytes of iETH (internal communication protocol) header information, which the input forwarding controller 214 can prepend to the packet when transferring the packet to the output data path controller 222 through the broadcast network 230. The network device can strip the 16-byte iETH header when the packet exits the front-panel port of the egress MAC 226. The network device may use the remaining internal header space (e.g., 48 bytes) to pass metadata from the input forwarding queue to the output forwarding queue for consumption by the output forwarding engine.

In some embodiments, the input data path controller 216 can perform ingress accounting functions, admission functions, and flow control for a no-drop class of service. The ingress admission control mechanism can determine whether to admit the packet into memory based on the amount of buffer memory available and the amount of buffer space already used by the ingress port and traffic class. The input data path controller 216 can forward the packet to the output data path controller 222 through the broadcast network 230.

In some embodiments, the broadcast network 230 can comprise a set of point-to-multipoint wires that provide connectivity between all slices of the ASIC. The input data path controller 216 may have a point-to-multipoint connection to the output data path controller 222 on all slices of the network device, including its own slice.

In some embodiments, the output data path controller 222 can perform egress buffer accounting, packet queuing, scheduling, and multicast replication. In some embodiments, all ports can dynamically share the egress buffer resource. In some embodiments, the output data path controller 222 can also perform packet shaping. In some embodiments, the network device can implement a simple egress queuing architecture. For example, in the event of egress port congestion, the output data path controller 222 can directly queue packets in the buffer of the egress slice. In some embodiments, there may be no virtual output queues (VoQs) on the ingress slice. This approach can simplify system buffer management and queuing.

In some embodiments, one or more network devices can support up to 10 traffic classes on egress, 8 user-defined classes identified by QoS group identifiers, a CPU control traffic class, and a Switched Port Analyzer (SPAN) traffic class. Each user-defined class can have a unicast queue and a multicast queue per egress port. This approach can help ensure that no single port will consume more than its fair share of the buffer memory and cause buffer starvation for other ports.

In some embodiments, multicast packets may go through similar ingress and egress forwarding pipelines as the unicast packets but instead use multicast tables for multicast forwarding. In addition, multicast packets may go through a multistage replication process for forwarding to multiple destination ports. In some embodiments, the ASIC can include multiple slices interconnected by a non-blocking internal broadcast network. When a multicast packet arrives at a front-panel port, the ASIC can perform a forwarding lookup. This lookup can resolve local receiving ports on the same slice as the ingress port and provide a list of intended receiving slices that have receiving ports in the destination multicast group. The forwarding engine may replicate the packet on the local ports, and send one copy of the packet to the internal broadcast network, with the bit vector in the internal header set to indicate the intended receiving slices. In this manner, only the intended receiving slices may accept the packet off of the wire of the broadcast network. The slices without receiving ports for this group can discard the packet. The receiving slice can then perform local L3 replication or L2 fan-out lookup and replication to forward a copy of the packet to each of its local receiving ports.

In FIG. 2, the forwarding pipeline 200 also includes a flow cache 240, which when combined with direct export of collected telemetry from the ASIC (i.e., data hardware streaming), can enable collection of packet and flow metadata at line rate while avoiding CPU bottleneck or overhead. The flow cache 240 can provide a full view of packets and flows sent and received by the network device. The flow cache 240 can collect information on a per-packet basis, without sampling and without increasing latency or degrading performance of the network device. To accomplish this, the flow cache 240 can pull information from the forwarding pipeline 200 without being in the traffic path (i.e., the ingress forwarding pipeline 210 and the egress forwarding pipeline 220).

In addition to the traditional forwarding information, the flow cache 240 can also collect other metadata such as detailed IP and TCP flags and tunnel endpoint identifiers. In some embodiments, the flow cache 240 can also detect anomalies in the packet flow such as inconsistent TCP flags. The flow cache 240 may also track flow performance information such as the burst and latency of a flow. By providing this level of information, the flow cache 240 can produce a better view of the health of a flow. Moreover, because the flow cache 240 does not perform sampling, the flow cache 240 can provide complete visibility into the flow.

In some embodiments, the flow cache 240 can include an events mechanism to complement anomaly detection. This configurable mechanism can define a set of parameters that represent a packet of interest. When a packet matches these parameters, the events mechanism can trigger an event on the metadata that triggered the event (and not just the accumulated flow information). This capability can give the flow cache 240 insight into the accumulated flow information as well as visibility into particular events of interest. In this manner, networks, such as a network implementing the network analytics system 100, can capture telemetry more comprehensively and not impact application and network performance.

Returning to FIG. 1, the network telemetry captured by the software sensors 112 and hardware sensors 114 can include metadata relating to individual packets (e.g., packet size, source address, source port, destination address, destination port, etc.); flows (e.g., number of packets and aggregate size of packets having the same source address/port, destination address/port, L3 protocol type, class of service, router/switch interface, etc. sent/received without inactivity for a certain time (e.g., 15 seconds) or sent/received over a certain duration (e.g., 30 minutes)); flowlets (e.g., flows of sub-requests and sub-responses generated as part of an original request or response flow and sub-flows of these flows); bidirectional flows (e.g., flow data for a request/response pair of flows having corresponding source address/port, destination address/port, etc.); groups of flows (e.g., flow data for flows associated with a certain process or application, server, user, etc.), sessions (e.g., flow data for a TCP session); or other types of network communications of specified granularity. That is, the network telemetry can generally include any information describing communication on all layers of the Open Systems Interconnection (OSI) model. In some embodiments, the network telemetry collected by the sensors 112 and 114 can also include other network traffic data such as hop latency, packet drop count, port utilization, buffer information (e.g., instantaneous queue length, average queue length, congestion status, etc.), and other network statistics.

The network analytics system 100 can associate a flow with a server sending or receiving the flow, an application or process triggering the flow, the owner of the application or process, and one or more policies applicable to the flow, among other telemetry. The telemetry captured by the software sensors 112 can thus include server data, process data, user data, policy data, and other data (e.g., virtualization information, tenant information, sensor information, etc.). The server telemetry can include the server name, network address, CPU usage, network usage, disk space, ports, logged users, scheduled jobs, open files, and similar information. In some embodiments, the server telemetry can also include information about the file system of the server, such as the lists of files (e.g., log files, configuration files, device special files, etc.) and/or directories stored within the file system as well as the metadata for the files and directories (e.g., presence, absence, or modifications of a file and/or directory). In some embodiments, the server telemetry can further include physical or virtual configuration information (e.g., processor type, amount of random access memory (RAM), amount of disk or storage, type of storage, system type (e.g., 32-bit or 64-bit), operating system, public cloud provider, virtualization platform, etc.).

The process telemetry can include the process name (e.g., bash, httpd, netstat, etc.), process identifier, parent process identifier, path to the process (e.g., /usr2/username/bin/, /usr/local/bin, /usr/bin, etc.), CPU utilization, memory utilization, memory address, scheduling information, nice value, flags, priority, status, start time, terminal type, CPU time taken by the process, and the command string that initiated the process (e.g., "/opt/tetration/collector/tet-collector--config_file/etc/tetration/collector/collector.config --timestamp_flow_info --logtostderr --utc_time in file_name true --max_num_ssl_sw_sensors 63000 --enable_client_certificate true"). The user telemetry can include information regarding a process owner, such as the user name, user identifier, user's real name, e-mail address, user's groups, terminal information, login time, expiration date of login, idle time, and information regarding files and/or directories of the user.

The other data sources 116 can include devices, protocols, or applications where the software sensors 112 and the hardware sensors 114 may not be available, such as Encapsulated Switched Port Analyzer (ERSPAN), NetFlow, Cisco® AnyConnect Network Visibility Module (NVM), NetFlow, load balancers, and so forth. The other data sources 116 can also include data obtained from a Baseboard Management Controller (BMC), such as power level, temperature, and other sensor readings. In addition, the other data sources 116 can include a Global Positioning System (GPS) or other location system (e.g., Cisco® Hyperlocation System, Cisco® Connected Mobile Experience (CMX), Cisco DNA™ Spaces, etc.) at various levels of granularity, such as continent or geographic region, country, state, city, address, building, floor, room, row, rack, cage door position, and so forth.

In some embodiments, the other data sources 116 can include various resources available to a network operator, such as a Configuration Management Database (CMDB) or Configuration Management System (CMS). The CMDB/CMS may transmit configuration data in a suitable format (e.g., JavaScript® Object Notation (JSON), Extensible Mark-up Language (XML), Yet Another Mark-up Language (YAML), etc.). CMDB/CMS, a Building Management System (BMS), Building Automation System (BAS), a centralized network management system (e.g., Cisco® Digital Network Architecture (Cisco DNA™) Center, Cisco® SD-WAN vManage, Cisco® Application-Centric Infrastructure (Cisco ACI™), Cisco® Application Policy Infrastructure Controller (APIC), Cisco Meraki™ or Meraki® Dashboard, Cisco One™, Cisco Intersight™, Cisco® Unified Computing System (Cisco UCS®) Central, Cisco UCS® Manager, Cisco UCS® Director, Cisco® Integrated Management Controller (IMC) Supervisor, Cisco Prime®, Cisco Cloud-Center®, Cisco® Container Platform, Cisco® Intelligent Automation for Cloud, Cisco® Intercloud Fabric, Cisco® Network Services Manager, Cisco Prime® Network Services Controller, Cisco® Virtualized Infrastructure Manager, Cisco® Data Center Network Manager, Cisco® Dynamic Fabric Automation, Cisco® Fabric Manager, Cisco® Fog Director, Cisco Network Director®, Cisco Firepower® Management Center, Cisco® Defense Orchestrator, Cisco® Security Manager, or other system for monitoring and managing multiple servers, networks, server storage, etc.), BMCs, GPS or other location system, a network inventory or asset management system, and the like.

The processing pipeline 122 of the analytics engine 120 can collect and process the telemetry. In some embodiments, the processing pipeline 122 can retrieve telemetry from the software sensors 112 and the hardware sensors 114 every 100 ms or faster. Thus, the network analytics system 100 may not miss or is much less likely than conventional systems to miss "mouse" flows, which typically collect telemetry every 60 seconds. In addition, as the telemetry tables can flush often, the software sensors 112 and the hardware sensors 114 do not or are much less likely than conventional systems to drop telemetry because of overflow/lack of memory. An additional advantage of this approach is that the network analytics system 100 can be responsible for flow-state tracking instead of network devices. Thus, the ASICs of the network devices of various embodiments can be simpler or can incorporate other features.

In some embodiments, the processing pipeline 122 can filter out extraneous or duplicative data or it can create summaries of the telemetry. In some embodiments, the processing pipeline 122 may process only certain types of telemetry and disregard the rest. For example, the processing pipeline 122 may process only high-priority telemetry, telemetry associated with a particular subnet (e.g., finance department, human resources department, etc.), telemetry associated with a particular application (e.g., business-critical applications, compliance software, health care applications, etc.), telemetry from external-facing servers, and so forth. As another example, the processing pipeline 122 may process only a representative sample of telemetry (e.g., every 1,000th packet or other suitable sample rate).

Collecting and/or processing telemetry from multiple servers of the network (including within multiple partitions of virtualized hosts) and from multiple network devices operating between the servers can provide a comprehensive view of network behavior. The capture and/or processing of telemetry from multiple perspectives rather than just at a single device located in the data path (or in communication with a component in the data path) can allow the data to be correlated from the various data sources, which may be used as additional data points by the analytics engine 120.

In addition, collecting and/or processing telemetry from multiple points of view can enable capture of more accurate data. For example, a conventional network may consist of external-facing network devices (e.g., routers, switches, network appliances, etc.) such that the conventional network may not be capable of monitoring east-west telemetry, including Virtual Machine to Virtual Machine (VM-to-VM) or container-to-container communications on a same host. As another example, the conventional network may drop some packets before those packets traverse a network device incorporating a sensor. The processing pipeline 122 can substantially mitigate or eliminate these issues altogether by capturing and processing telemetry from multiple points of potential failure. Moreover, the processing pipeline 122 can verify multiple instances of data for a flow, such as telemetry from a source (e.g., physical server, hypervisor, container orchestrator, other virtual instance manager, virtual machine, container, other virtual entity, network device, etc.); one or more intermediate network devices; and a destination against one another.

In some embodiments, the processing pipeline 122 can assess a degree of accuracy of telemetry for a single flow captured by multiple sensors and utilize the telemetry from a single sensor determined to be the most accurate and/or complete. The degree of accuracy can be based on factors such as network topology (e.g., a sensor closer to the source may be more likely to be more accurate than a sensor closer to the destination), a state of a sensor or a server hosting the sensor (e.g., a compromised sensor/server may have less accurate telemetry than an uncompromised sensor/server), or telemetry volume (e.g., a sensor capturing a greater amount of telemetry may be more accurate than a sensor capturing a smaller amount of telemetry).

In some embodiments, the processing pipeline 122 can assemble the most accurate telemetry from multiple sensors. For instance, a first sensor along a data path may capture data for a first packet of a flow but may be missing data for a second packet of the flow while the reverse situation may occur for a second sensor along the data path. The processing pipeline 122 can assemble data for the flow from the first packet captured by the first sensor and the second packet captured by the second sensor.

In some embodiments, the processing pipeline 122 can also disassemble or decompose a flow into sequences of request and response flowlets (e.g., sequences of requests and responses of a larger request or response) of various granularities. For example, a response to a request to an enterprise application may result in multiple sub-requests and sub-responses to various back-end services (e.g., authentication, static content, data, search, sync, etc.). The processing pipeline 122 can break a flow down to its constituent components to provide greater insight into application and network performance. The processing pipeline 122 can perform this resolution in real time or substantially real time (e.g., no more than a few minutes after detecting the flow).

The processing pipeline 122 can store the telemetry in a data lake (not shown), a large-scale storage repository characterized by massive storage for various types of data, enormous processing power, and the ability to handle nearly limitless concurrent tasks or jobs. In some embodiments, the analytics engine 120 may deploy at least a portion of the data lake using the Apache Hadoop® Distributed File System (Apache HDFS™). HDFS™ is a highly scalable and distributed file system that can scale to thousands of cluster nodes, millions of files, and petabytes of data. A feature of HDFS™ is its optimization for batch processing, such as by coordinating data computation to where data is located. Another feature of HDFS™ is its utilization of a single namespace for an entire cluster to allow for data coherency in a write-once, read-many access model. A typical HDFS™ implementation separates files into blocks, which are typically 64 MB in size and replicated in multiple data nodes. Clients access data directly from the data nodes.

The processing pipeline 122 can propagate the processed data to one or more engines, monitors, and other components of the analytics engine 120 (and/or the components can retrieve the data from the data lake), such as an application dependency mapping (ADM) engine 124, a policy engine 126, an inventory monitor 128, a flow monitor 130, and an enforcement engine 132.

The ADM engine 124 can determine dependencies of applications running in the network, such as how processes on different servers interact with one another to perform the functions of the application. Particular patterns of traffic may correlate with particular applications. The ADM engine 124 can evaluate flow data, associated data, and customer/third party data processed by the processing pipeline 122 to determine the interconnectivity or dependencies of the application to generate a graph for the application (e.g., an application dependency mapping). For example, in a conventional three-tier architecture for a web application, first servers of the web tier, second servers of the application tier, and third servers of the data tier make up the web application. From flow data, the ADM engine 124 may determine that there is first traffic flowing between external servers on port 80 of the first servers corresponding to Hypertext Transfer Protocol (HTTP) requests and responses. The flow data may also indicate second traffic between first ports of the first servers and second ports of the second servers corresponding to application server requests and responses and third traffic flowing between third ports of the second servers and fourth ports of the third servers corresponding to database requests and responses. The ADM engine 124 may define an application dependency map or graph for this application as a three-tier application including a first endpoint group (EPG) (i.e., groupings of application tiers or clusters, applications, and/or application components for implementing forwarding and policy logic) comprising the first servers, a second EPG comprising the second servers, and a third EPG comprising the third servers.

The policy engine 126 can automate (or substantially automate) generation of policies for the network and simulate the effects on telemetry when adding a new policy or removing an existing policy. Policies establish whether to allow (e.g., forward) or deny (i.e., drop) a packet or flow in a network. Policies can also designate a specific route by which the packet or flow traverses the network. In addition, policies can classify the packet or flow so that certain kinds of traffic receive differentiated service when used in combination with queuing techniques such as those based on priority, fairness, weighted fairness, token bucket, random early detection, round robin, among others, or to enable the network analytics system 100 to perform certain operations on the servers and/or flows (e.g., enable features like ADM, application performance management (APM) on labeled servers, prune inactive sensors, or to facilitate search on applications with external traffic, etc.).

The policy engine 126 can automate or at least significantly reduce manual processes for generating policies for the network. In some embodiments, the policy engine 126 can define policies based on user intent. For instance, an enterprise may have a high-level policy that production servers cannot communicate with development servers. The policy engine 126 can convert the high-level business policy to more concrete enforceable policies. In this example, the user intent is to prohibit production machines from communicating with development machines. The policy engine 126 can translate the high-level business requirement to a more concrete representation in the form of a network policy, such as a policy that disallows communication between a subnet associated with production (e.g., 10.1.0.0/16) and a subnet associated with development (e.g., 10.2.0.0/16).

In some embodiments, the policy engine 126 may also be capable of generating system-level policies not traditionally supported by network policies. For example, the policy engine 126 may generate one or more policies limiting write access of a collector process to/local/collector/, and thus the collector may not write to any directory of a server except for this directory.

In some embodiments, the policy engine 126 can receive an application dependency map (whether automatically generated by the ADM engine 124, manually defined and transmitted by a CMDB/CMS or a component of the presentation layer 140 (e.g., Web Graphical User Interface (GUI) 142, Restful State Transfer (REST) Application Programming Interface (API) 144, etc.)) and define policies that are consistent with the received application dependency map. In some embodiments, the policy engine 126 can generate whitelist policies in accordance with the received application dependency map. In a whitelist system, a network denies a packet or flow by default unless a policy exists that allows the packet or flow. A blacklist system, on the other hand, permits a packet or flow as a matter of course unless there is a policy that explicitly prohibits the packet or flow. In other embodiments, the policy engine 126 can generate blacklist policies, such as to maintain consistency with existing policies.

In some embodiments, the policy engine 126 can validate whether changes to policy will result in network misconfiguration and/or vulnerability to attacks. The policy engine 126 can provide what if analysis, i.e., analysis regarding what would happen to network traffic upon adding one or more new policies, removing one or more existing policies, or changing membership of one or more EPGs (e.g., adding one or more new endpoints to an EPG, removing one or more endpoints from an EPG, or moving one or more endpoints from one EPG to another). In some embodiments, the policy engine 126 can utilize historical ground truth flows for simulating network traffic based on what if experiments. That is, the policy engine 126 may apply the addition or removal of policies and/or changes to EPGs to a simulated network environment that mirrors the actual network to evaluate the effects of the addition or removal of policies and/or EPG changes. The policy engine 126 can determine whether the policy changes break or misconfigure networking operations of any applications in the simulated network environment or allow any attacks to the simulated network environment that were previously thwarted by the actual network with the original set of policies. The policy engine 126 can also determine whether the policy changes correct misconfigurations and prevent attacks that occurred in the actual network. In some embodiments, the policy engine 126 can also evaluate real time flows in a simulated network environment configured to operate with an experimental policy set or experimental set of EPGs to understand how changes to policy or EPGs affect network traffic in the actual network.

The inventory monitor 128 can continuously track the network's assets (e.g., servers, network devices, applications, etc.) based on telemetry processed by the processing pipeline 122. In some embodiments, the inventory monitor 128 can assess the state of the network at a specified interval (e.g., every 1 minute). In some embodiments, the inventory monitor 128 can periodically take snapshots of the states of applications, servers, network devices, and/or other elements of the network. In other embodiments, the inventory monitor 128 can capture the snapshots when events of interest occur, such as an application experiencing latency that exceeds an application latency threshold; the network experiencing latency that exceeds a network latency threshold; failure of a server, network device, or other network element; and similar circumstances. Snapshots can include a variety of telemetry associated with network elements. For example, a snapshot of a server can information regarding processes executing on the server at a time of capture, the amount of CPU utilized by each process (e.g., as an amount of time and/or a relative percentage), the amount of virtual memory utilized by each process (e.g., in bytes or as a relative percentage), the amount of disk utilized by each process (e.g., in bytes or as a relative percentage), and a distance (physical or logical, relative or absolute) from one or more other network elements.

In some embodiments, on a change to the network (e.g., a server updating its operating system or running a new process; a server communicating on a new port; a virtual machine, container, or other virtualized entity migrating to a different host and/or subnet, VLAN, Virtual Extensible LAN (VXLAN), or other network segment; etc.), the inventory monitor 128 can alert the enforcement engine 132 to ensure that the network's policies are still in force in view of the change(s) to the network.

The flow monitor 130 can analyze flows to detect whether they are associated with anomalous or malicious traffic. In some embodiments, the flow monitor 130 may receive examples of past flows determined to be compliant traffic and/or past flows determined to be non-compliant or malicious traffic. The flow monitor 130 can utilize machine learning to analyze telemetry processed by the processing pipeline 122 and classify each current flow based on similarity to past flows. On detection of an anomalous flow, such as a flow that does not match any past compliant flow within a specified degree of confidence or a flow previously classified as non-compliant or malicious, the policy engine 126 may send an alert the enforcement engine 132 and/or to the presentation layer 140. In some embodiments, the network may operate within a trusted environment for a period of time so that the analytics engine 120 can establish a baseline of normal operation The enforcement engine 132 can be responsible for enforcing policy. For example, the enforcement engine 132 may receive an alert from the inventory monitor 128 on a change to the network or an alert from the flow monitor upon the flow monitor 130 detecting an anomalous or malicious flow. The enforcement engine 132 can evaluate the network to distribute new policies or changes to existing policies, enforce new and existing policies, and determine whether to generate new policies and/or revise/remove existing policies in view of new assets or to resolve anomalous.

In some embodiments, the network analytics system 100 can capture network flow data from multiple knowledge domains, including the flow domain (e.g., source, destination, number of packets in a flow, number of bytes of a flow, etc.) and one or more out-of-band domains, such as the host domain (e.g., host name, operating system, disk space, energy usage, logged users, scheduled jobs, open files, information regarding files stored on a host, etc.), the virtualization domain (e.g., type of virtualization, virtualization platform, virtual machine, container information, other virtual server information, tenant information, etc.), the process domain (e.g., process identifier, process parameters, parent process identifier, path, nice value or priority, etc.), the user domain (e.g., user identifier, user role, user group, etc.), the policy domain (e.g., firewall rules, access control lists, host integrity policies, etc.), and other knowledge domains (e.g., power level, temperature, business unit or function, physical location, etc.), and so forth. This can constitute "big data" or large volumes of data (e.g., terabytes, petabytes, or more) being received and transmitted data at high velocities (e.g., near real-time or real-time) and involving a large variety of data, such as data having different structure (e.g., structured, semi-structured, unstructured, etc.), data of different types (e.g., text, audio, video, etc.), data originating from different sources (e.g., enterprise systems, social networks, clickstreams, Internet of Things (IoT) devices, etc.), data having different rates of change (e.g., batch, streaming, etc.), or data having other heterogeneous characteristics.

The network analytics system 100 can enrich conventional flow data by associating flows with the additional context of the systems that generate the flows. This can occur in real-time or near real-time with hardware acceleration as discussed above with respect to FIG. 2 and with various optimizations as discussed further below. In this sense, an enriched flow can be characterized as a post-processed data product. And unlike a conventional flow, such as provided by NetFlow, sFlow, Packet Capture (PCAP), and similar mechanisms that may be limited to the flow domain, an enriched flow can include out-of-band data or network metadata from other knowledge domains. In this manner, an enriched flow can readily provide more comprehensive information on the who, what, where, when, why, and how of a flow.

Typically, expert knowledge (e.g., networking, Structured Query Language (SQL), the particulars of the network analytics system, etc.) would be required to extract useful information from big data. In some embodiments, the network analytics system 100 can efficiently associate or annotate network inventory (e.g., physical and virtual network devices and endpoints as well as data abstractions, such as flows, policies, applications, services, and so forth) across multiple knowledge domains (e.g., via the processing pipeline 122) and generate interfaces (e.g., via the presentation layer 140) to enable users with varying levels of technical experience to conduct detailed fault injection analysis. For example, the interfaces can include visualizations and support interactions to find the answers to questions covering a broad range of topics and disparate levels of subject matter interest and expertise, such as what happens to the network if a particular device is rebooted? What breaks if this firewall rule changes? Is this firewall rule even in use? What is the scope of effort to upgrade every device running a particular operating system? Will this device change impact an ongoing heart surgery? Does this physical infrastructure have any relationship to .com revenue generating applications? Are any services hosted at a branch location? Are there any services with Network Time Protocol (NTP) or Domain Name System (DNS) dependencies outside of their country of residence? What communications go on between the U.S. and China (even if the communications occur over private IP addresses)?

Figure 3A:
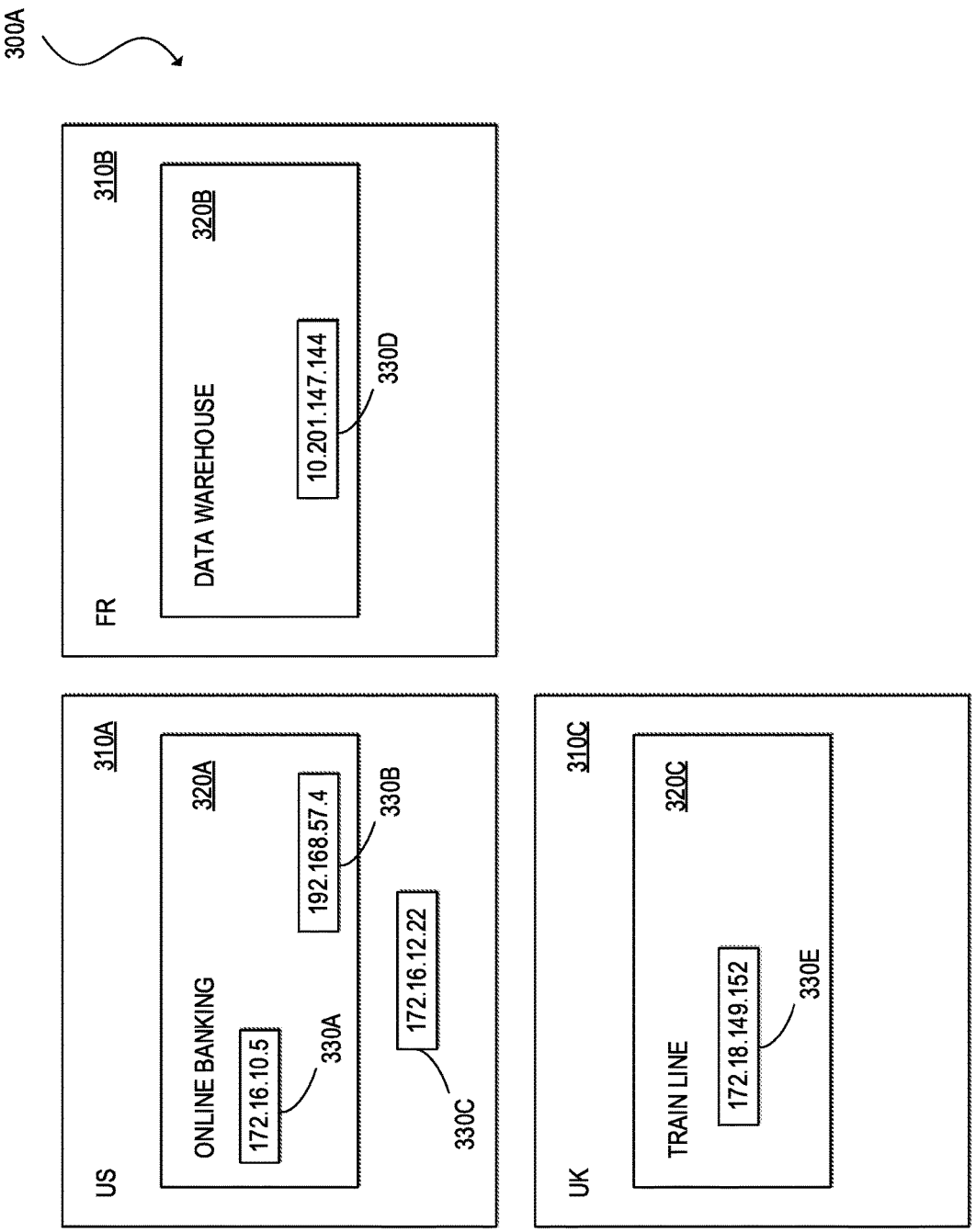
FIG. 3A illustrates a block diagram of an example of a network in accordance with an embodiment.

FIG. 3A illustrates a block diagram of an example of a portion of a network 300A including network elements selected or filtered according to one or more dimensions of interest, such as one or more conventional flow attributes (e.g., source and destination IP addresses, ports, protocol, etc.) and one or more enriched flow attributes or attributes outside of the conventional flow domain (e.g., flows of a particular user or group, flows in a certain geographic location or between geographic locations, flows of specific business units during business hours, etc.).

In FIG. 3A, the network 300A can be logically segmented into a United States (US) geographic location 310A, a French (FR) geographic location 310B, and a United Kingdom (UK) geographic location 310C (collectively, geographic locations 310). Within the geographic locations 310, there can be an online banking business unit 320A and an endpoint represented by an IP address 330C that may not be associated with any business unit, a data warehouse business unit 320B, and a train line business unit 320C (collectively, business units 320), respectively. The business units 320 can include endpoints with IP addresses 330A and 330B, 330D, and 330E (collectively, IP addresses 330), respectively. Table 1 below sets forth an example of out-of-band network data or metadata that can be collected from the network 300A and utilized to enrich flow data. Out-of-band network data or network metadata can refer to data regarding network traffic data obtained outside of the flow domain, such as data in the host domain, the virtualization domain, the process domain, the user domain, the policy domain, and so forth. The out-of-band network data or network metadata can be retrieved from network devices, physical or virtual hosts generating traffic, and other resources available to a network operator, such as a CMDB/CMS, BMS, BAS, network management system, BMCs, GPS or other location system, network inventory or asset management, and the like.

TABLE 1

Example of Network Metadata

| IP ADDRESS | LOCATION | BUSINESS UNIT |
|---|---|---|
| 192.168.57.4 | US | Online Banking |
| 10.201.147.44 | FR | Data Warehouse |
| 172.18.149.152 | UK | Train Line |
| 172.16.10.5 | US | Online Banking |
| 172.16.12.22 | US | NULL |

Figure 3B:
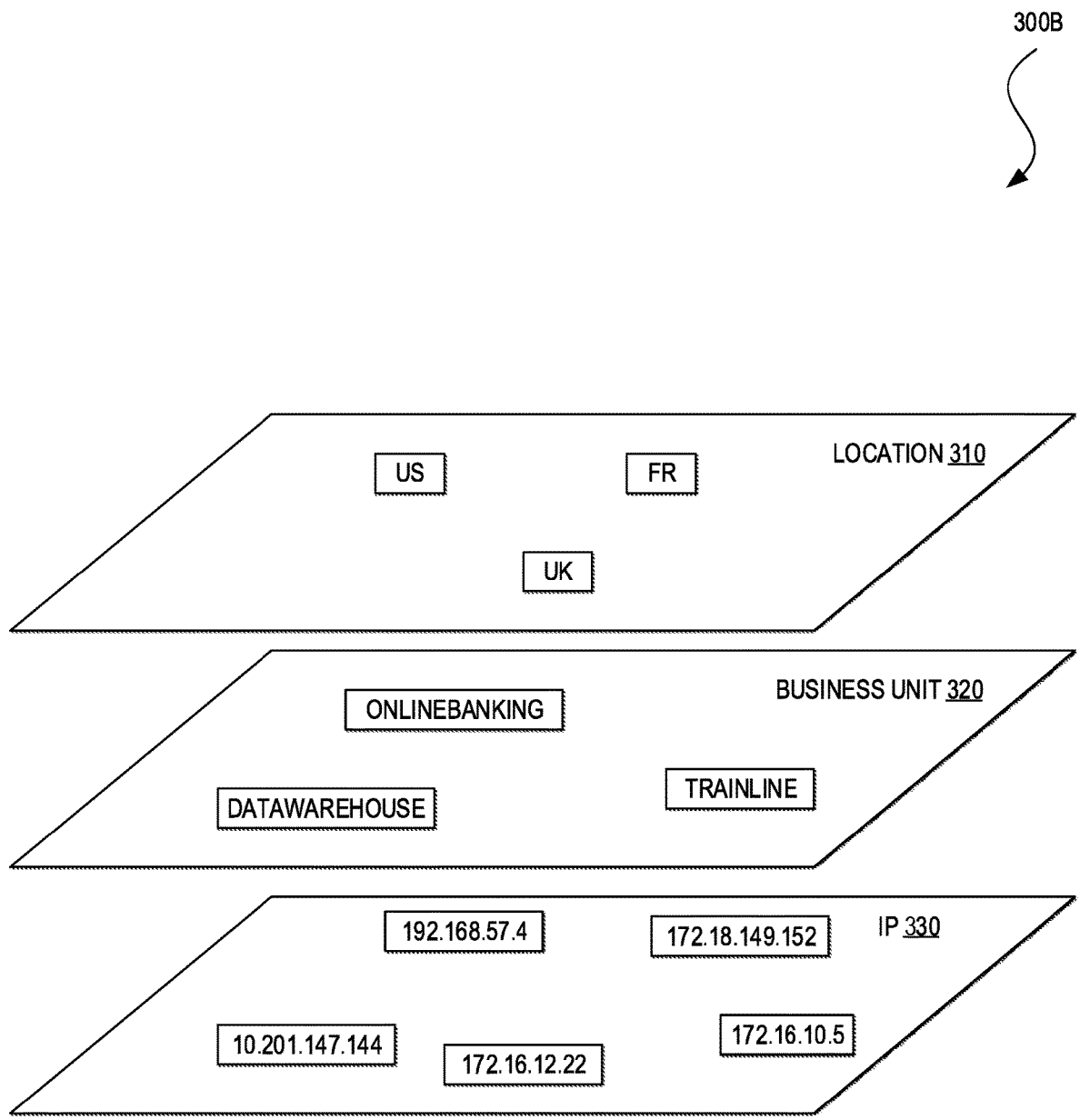
FIGS. 3B-3D illustrate examples of user interfaces generated from the network of FIG. 3A in accordance with some embodiments.

FIG. 3B illustrates an example of a user interface 300B that can be generated from the network 300A. The network analytics system can create the user interface 300B by isolating flow data by one or more dimensions (e.g., also sometimes referred to as tags, keys, labels, categories, attributes, classes, columns, etc.) of conventional flow data (e.g., IP address) and one or more dimensions of enriched flow data (e.g., a geographic location and a business unit). The user interface 300B can map the values for each dimension onto a plane. For example, the network 300A can be segmented according to a first plane corresponding to the geographic locations 310, a second plane corresponding to the business units 320, and a third plane corresponding to the IP addresses 330. Other embodiments may combine multiple dimensions on a plane (e.g., such as in FIG. 3D) and/or map one dimension onto multiple planes (e.g., a geographic location hierarchy or unary search tree (UST) comprising a continent, country, state, city, address, building, floor, room, rack, etc.).

Figure 3C:
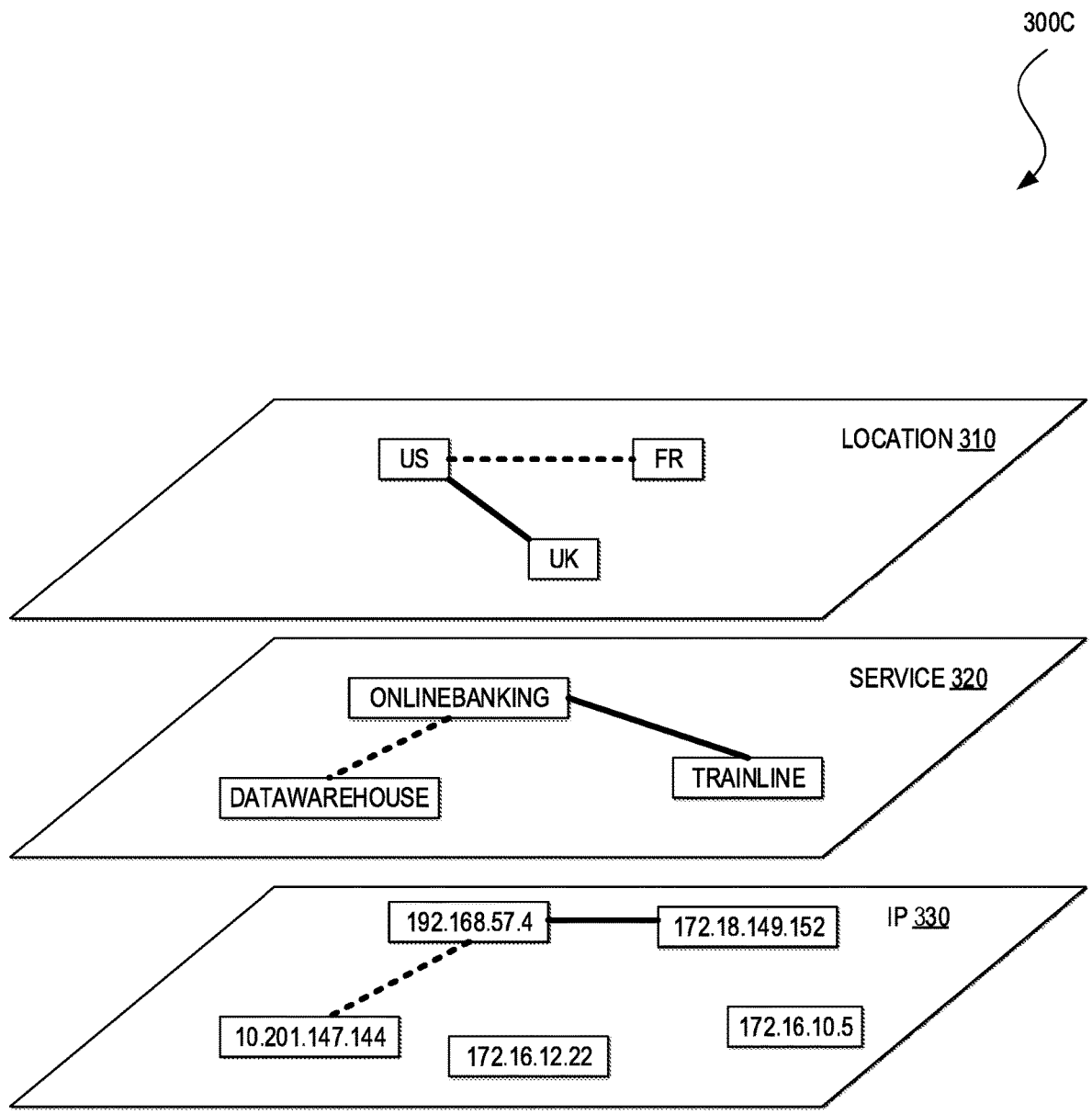

FIG. 3C illustrates an example of a user interface 300C that can be derived from the user interface 300B. The network analytics system can create the user interface 300C utilizing a graph representation for each dimension of enriched flow data in which the nodes of the graph can represent the values of each dimension of enriched flow data and the edges can represent flows between endpoints corresponding to the nodes and either actually observed in the network (historically or in real-time) or simulated for fault injection or what-if analysis. Table 2 below sets forth an example of the observed or simulated flows in the network 300A over a predetermined duration and/or satisfying one or more other predetermined conditions that can be automatically selected or specified by a user, such as a first flow from the endpoint having the IP address 330B to the endpoint having the IP address 330D, and a second flow from the endpoint having the IP address 330B to the endpoint having the IP address 330E. The network analytics system can draw a dashed line to represent the first flow and a thick solid line to represent the second flow in the plane corresponding to the IP addresses 330.

TABLE 2

Example of Observed or Simulated Flows

| FLOW ID | SOURCE IP | DESTINATION IP |
|---|---|---|
| 1 | 192.168.57.4 | 10.201.147.144 |
| 2 | 192.168.57.4 | 172.18.149.152 |

The network analytics system can map the flows of Table 2 to the out-of-band network data or network metadata dimensions of Table 1, such by joining Tables 1 and 2 based on IP address and Location and IP address and Business Unit to respectively produce Tables 3 and 4 below. Similar to the graph representation for the IP address 330, the network analytics system can draw dashed lines to represent the first flow in the graph representation on the plane corresponding to the geographic locations 310 and the graph representation in the plane corresponding to the business units 320 and thick solid lines to represent the second flow in the graph representations of these planes.

In some embodiments, to further contextualize enriched flow data, graphs representing locations may overlay a geographic map, campus map, building plan, floor plan, and so forth and the nodes of the graph may be positioned by geographic location; graphs representing roles, privileges, business units, departments, or other organizational attributes may overlay an organizational chart or tree and the nodes of the graph may be positioned by the organization represented by each node; and graphs representing applications or services can overlay an application dependency map and the nodes of the graph may be positioned according to application or service represented by each node.

TABLE 3

Example of Associating Flows with Location Metadata

| FLOW ID | SOURCE LOCATION | DESTINATION LOCATION |
|---|---|---|
| 1 | US | FR |
| 2 | US | UK |

TABLE 4

Example of Associating Flows with Business Unit Metadata

| FLOW ID | SOURCE BUSINESS UNIT | DESTINATION BUSINESS UNIT |
|---|---|---|
| 1 | Online Banking | Data Warehouse |
| 2 | Online Banking | Train Line |

Figure 3D:
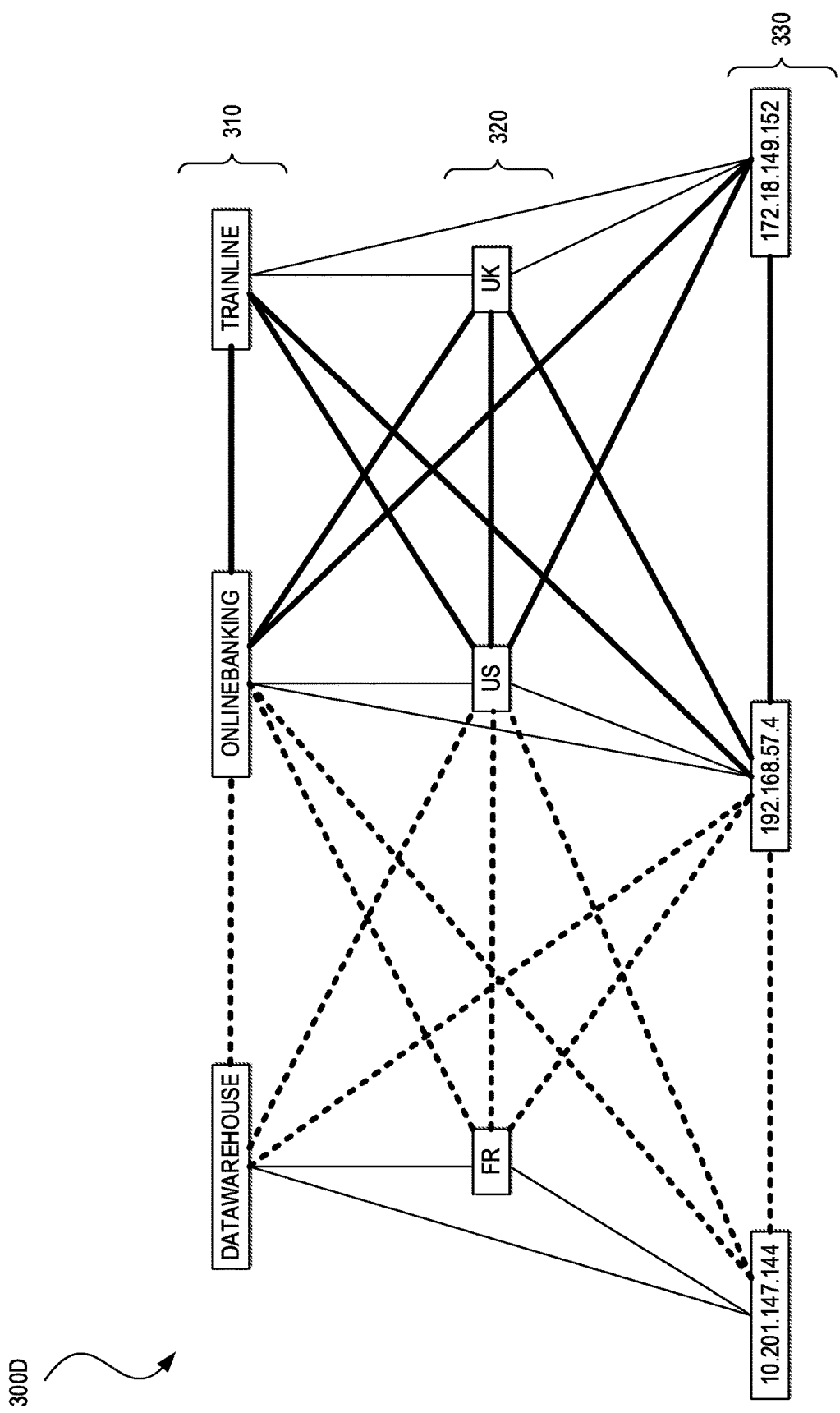

FIG. 3D illustrates an example of a user interface 300D that can be generated from Tables 1-4. The network analytics system can represent the associations of the enriched flow data of Table 1 as the thin solid line, the first flow as the dashed line, and the second flow as the thick solid line. As an example, the network analytics system can generate the user interface 300D by collapsing or combining multiple dimensions or planes to show the interrelationships among the dimensions. The fact that flows can intersect the planes defined by tags or keys of the enriched flow data allows the network analytics system to create a full mesh of relationships between source and destination tag values.

In some embodiments, the network analytics system can support various interactions for manipulating the user interfaces of FIGS. 3B-3D. As an example, the planes segregating flows according to different dimensions can operate as pivoting planes. The network analytics system can receive an initial query, such as whether there are any dependencies between the United States and France because a governmental regulation, corporate policy, or other requirement dictates that there should be no dependencies between these countries. To answer this question, the network analytics system can filter observed flow data in which the source is the United States and the provider is the France or vice versa and return a set of flows. The network analytics system may subsequently receive a pivoting query, such as a request to show which business units are communicating with each other from the set of flows returned in response to the initial inquiry. The network analytics system can then display the plane or graph representation corresponding to the business units (e.g., the plane corresponding to the business units 320) with only those business units having observed flow data from the initial inquiry. In some embodiments, this can be equivalent visually to shuffling a deck of cards or pulling a card out of a deck.

As another example, the network analytics system can support iterative querying to receive sufficient information to move on to the next query in an progressive investigative process. The network analytics system can search for flows starting within a certain plane or between planes and gradually reduce the results into a usable data set that is more readily consumable by a user. In some embodiments, this can be equivalent visually to forming a pyramidal stack of cards or "zooming in" or magnifying a data space.

In some embodiments, the network analytics system can use routing protocols for capturing out-of-band network data or network metadata to enrich conventional flow data. For example, routing prefixes contained in the routing tables of network devices can be utilized as metadata for providing conventional flow data with additional context. In some embodiments, the network analytics system can use network device configurations for enhancing conventional flow data. The network device configuration data can include details about address assignment, such as how a network device maps addresses to interfaces. Network configuration data can be an advantageous source of network metadata because it is often centralized within a network operator's configuration repositories and retrieving the configuration information does not require network device polling.

In some embodiments, the network analytics system can leverage the specific practices of a network operator for obtaining out-of-band network data or network metadata for enriching conventional flow data. For example, a network operator may utilize a standardized device naming format that can be used as network metadata, such as if the network operator differentiates development devices using "DEV" and production devices as "PROD," incorporates a country code in the names of network elements for the countries in which the network elements are located, standardizes the names of devices (e.g., AABBCCDDEE, where AA can represent a location identifier; BB can represent the placement tier or function of the device; CC can represent the business unit; DD can represent the device type; and EE can represent the device sequence); or utilizes a standardized addressing scheme (e.g., using an IP address of 1.1.1.1 for branch back-up connectivity, which can be used to identify branch prefixes if this IP address is present in the network configuration of the device). Location information obtained via Simple Network Management Protocol (SNMP) or network device operating system can also be sources of information to enrich flow data.

Figure 4:
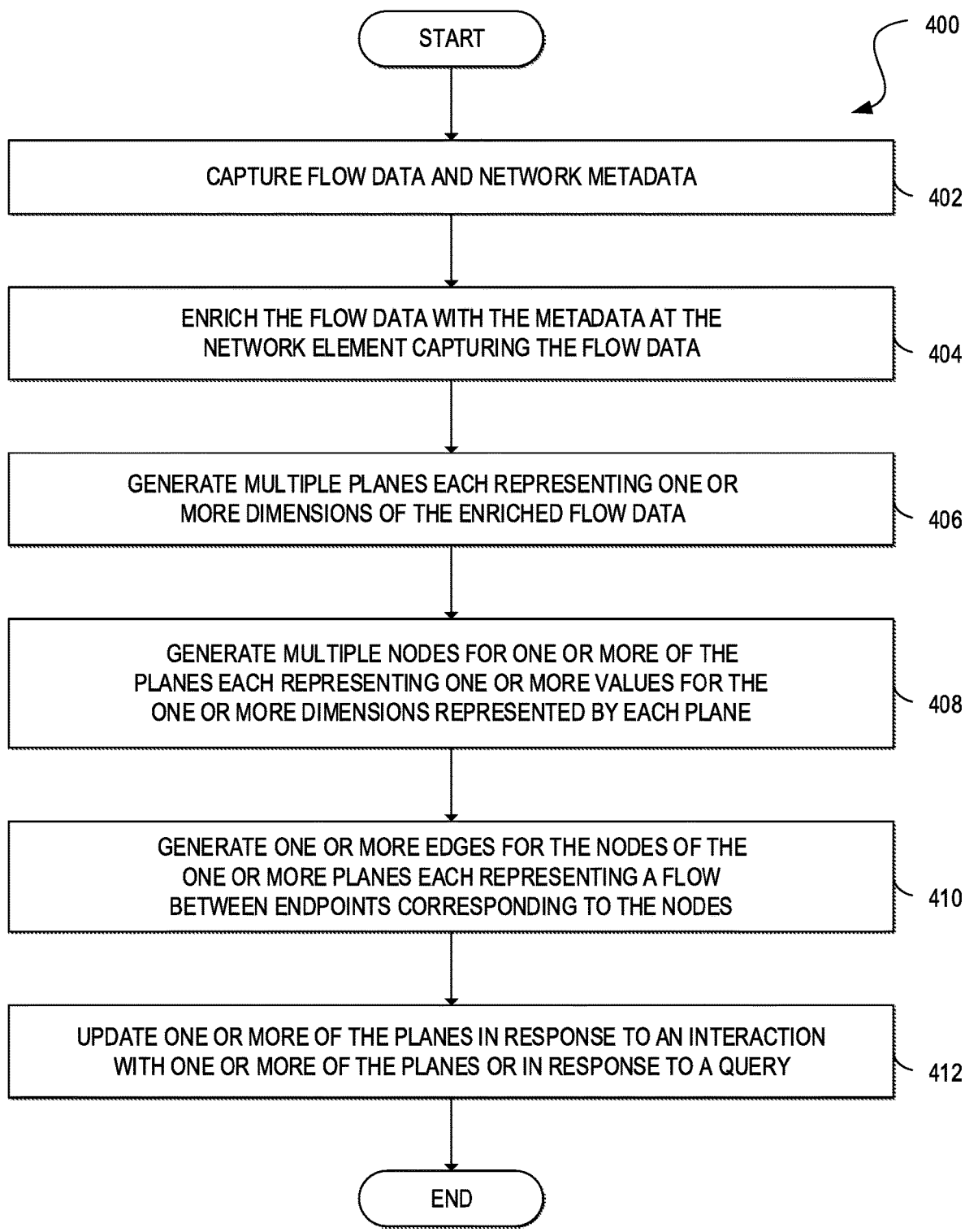
FIG. 4 illustrates a flow diagram of an example of a process for enriching flow data to analyze network security, availability, and compliance in accordance with an embodiment.

FIG. 4 illustrates a flow diagram of an example of a process 400 for enriching flow data to analyze network security, availability, and compliance. One of ordinary skill will understood that, for any processes discussed herein, there can be additional, fewer, or alternative steps performed in similar or alternative orders, or in parallel, within the scope of the various embodiments unless otherwise stated. In some embodiments, the process 400 may be performed by a network analytics system (e.g., the network analytics system 100).

The process 400 may begin with a step 402 in which the network analytics system can capture conventional flow data and out-of-band network data or network metadata from various elements of a network (e.g., network devices, physical or virtual servers, flows, policies, applications, services, etc.). The network analytics system may capture the network telemetry from software sensors (e.g., the software sensors 112), hardware sensors (e.g., the hardware sensors 114), and other data sources 116 (e.g., the other data sources 116, such as ERSPAN, NetFlow, Cisco® Anyconnect NVM, load balancers, etc.). The out-of-band network data or network metadata can include host data, process data, user data, policy data, and so forth. In some embodiments, the network analytics system can also collect virtualization information, network topology information, application information (e.g., configuration information, previously generated application dependency maps, application policies, etc.), organizational information (e.g., business units, host naming conventions, IP addressing schemes, etc.), and other metadata from other data sources available to a network operator.

At step 404, the network analytics system can enrich the flow data by storing the associations between the flows and the associated metadata in-line with the network elements collecting the flow data (e.g., in real-time or near real-time). These operations would typically consume extensive computing resources (e.g., CPU, memory, storage, bandwidth, etc.) of the network elements. However, various optimizations can be utilized to ensure that enrichment of flow data has little to no impact on the network elements performing the collection and export of network telemetry. These optimizations can include performing at least some of the collection and export using hardware as discussed with respect to FIG. 2.

In some embodiments, the network analytics system may also utilize novel data structures and techniques for annotating or associating flows with additional contextual information. Ordinarily, processing streaming data or Extract, Transform, and Load (ETL) operations can be resource-intensive. This can be compounded in the case of flow data because the amount of metadata joined with flow data can be doubled (or more) because each flow can include two endpoints and transit virtualization software (e.g., hypervisor, container engine, etc.) and one or more intermediate network devices. Additionally, flows to and from endpoints may include missing data for a given dimension of metadata and database schema requirements may require storing a NULL value for that dimension. This can limit the amount of data retention and slow down data transfer.

For instance, Table 6 sets forth an example of raw flow data that may be captured by the network analytics system. Table 7 sets forth an example of out-of-band network data or network metadata that can be previously captured and stored in memory for association at run-time and/or concurrently captured with the raw flow data and likewise be used for annotating the raw flow data. In particular, Table 7 can be joined with Table 6 based on IP address.

TABLE 6

Example of Raw Flow Data

| FLOW ID | SOURCE IP | DESTINATION IP | PACKETS | BYTES |
|---|---|---|---|---|
| 1 | 1.1.1.1 | 2.1.1.1 | 10 | 868 |
| 2 | 1.1.1.1 | 2.1.1.2 | 5 | 193 |
| 3 | 2.1.1.1 | 2.1.1.2 | 1043 | 103482 |

TABLE 7

Example of Network Metadata

| IP ADDRESS | COUNTRY | STATE | CITY | BUILDING |
|---|---|---|---|---|
| 1.1.1.1 | USA | CA | San Jose | SJC10 |
| 1.1.1.2 | USA | CA | San Jose | NULL |
| 2.1.1.1 | USA | GA | Atlanta | ATL9 |
| 2.1.1.2 | USA | GA | NULL | NULL |

Table 8 sets forth an example of a join operation of Tables 6 and 7 based on IP address, which can expand raw flow data from five columns to thirteen columns (e.g., Flow ID, Source IP, Destination IP, Source Country, Source State, Source City, Source Building, Destination Country, Destination State, Destination City, Destination Building, Number of Packets, Number of Bytes).

TABLE 8

Example of Enriched Flow Data Not Using UST

| ID | SRC | DEST | S_CTRY | S_ST | ... | D_CITY | D_BLDG | PKTS | BYTES |
|---|---|---|---|---|---|---|---|---|---|
| 1 | 1.1.1.1 | 2.1.1.1 | USA | CA | ... | Atlanta | ATL9 | 10 | 868 |
| 2 | 1.1.1.1 | 2.1.1.2 | USA | CA | ... | NULL | NULL | 5 | 193 |
| 3 | 2.1.1.1 | 2.1.1.2 | USA | GA | ... | ATL9 | NULL | 10 | 103482 |

In some embodiments, the network analytics system may instead utilize a Unary Search Tree (UST) for compressing metadata and optimizing annotation of the raw flow data. The UST can be configurable to allow arbitrary metadata to be organized by intent. For example, Table 9 sets forth an example of a UST that compresses four dimensions of metadata (e.g., Country, State, City, and Building) to a single dimension (e.g., Location) that can reference a hierarchical structure, expressed here from left to right, with a root at the left-most value (e.g., Country), and the leaf at the right-most value (e.g., Building).

TABLE 9

Example of a Unary Search Tree

| KEY | SEARCH TREE |
|---|---|
| Location | Country > State > City > Building |

In addition to enabling the network analytics system store more flow data, the depth of the UST can also provide "fallback" logic to avoid having to populate missing data with unhelpful NULL values. That is, the UST can be used to select a value for a particular dimension based upon the values available at the greatest depth within the UST. If the value is not found within the right-most position of the UST, the network analytics system can fall back to the next position, right-to-left, until a value is found. Table 10 sets forth an example of enriched flow data using this approach. For instance, the network analytics system can avoid populating the second enriched flow with NULL values for the Destination City and Destination Building as in the case with the enriched flow data of Table 8 while the network analytics system can avoid populating the third enriched with a NULL value for the Destination Building as in the case with the enriched flow data of Table 8.

TABLE 10

Example of Enriched Flow Data Using UST

| FLOW ID | SRC | DEST | SRC_LOC | D_LOC | PKTS | BS |
|---|---|---|---|---|---|---|
| 1 | 1.1.1.1 | 2.1.1.1 | SJC10 | ATL9 | 10 | 868 |
| 2 | 1.1.1.1 | 2.1.1.2 | SJC10 | GA | 5 | 193 |
| 3 | 2.1.1.1 | 2.1.1.2 | ATL9 | GA | 10 | 103482 |

The network analytics system can use the enriched flow data for various analyses, such as network dependency visualization, fault injection or what-if analytics, and network troubleshooting, among other use cases. The network analytics system can utilize the enriched flow data to help users better understand the relationships between flows, and discover the dependencies between flows and systems. The enriched flow data can also be used as input into a fault injection or what-if analysis framework to show the cascading impact of a specified event. The network analytics system can also enhance conventional network troubleshooting tools using the enhanced flow data. The network analytics system can provide a graphical user interface (GUI) and support certain interactions for these types of analyses. The GUI can segregate flows along different dimensions or planes for improved visualization of dependencies. Each plane can represent one or more dimensions of flow data and metadata, and can include a graph representation of flows corresponding to those dimensions for an understanding of intra-dimensional or intra-plane dependencies. The GUI can also enable the end user to pivot between dimensions or planes for an understanding of inter-dimensional or inter-plane dependencies. The network analytics system can also generate alerts in the event of network faults, and the GUI may be used as a tool for intuiting dependencies and support pivoting between planes/iterative querying for fault management.

To generate the GUI, the process 400 may continue to step 406 in which the network analytics system can generate multiple planes each representing one or more dimensions of the enriched flow data. The network analytics system may typically utilize one dimension per plane but a different number of dimensions may be pre-configured (e.g., by a user or by the network analytics system intelligently determining the dimensions of interest) or configured at runtime (e.g., collapsing multiple dimensions or planes into fewer dimensions or planes).

Figure 5A:
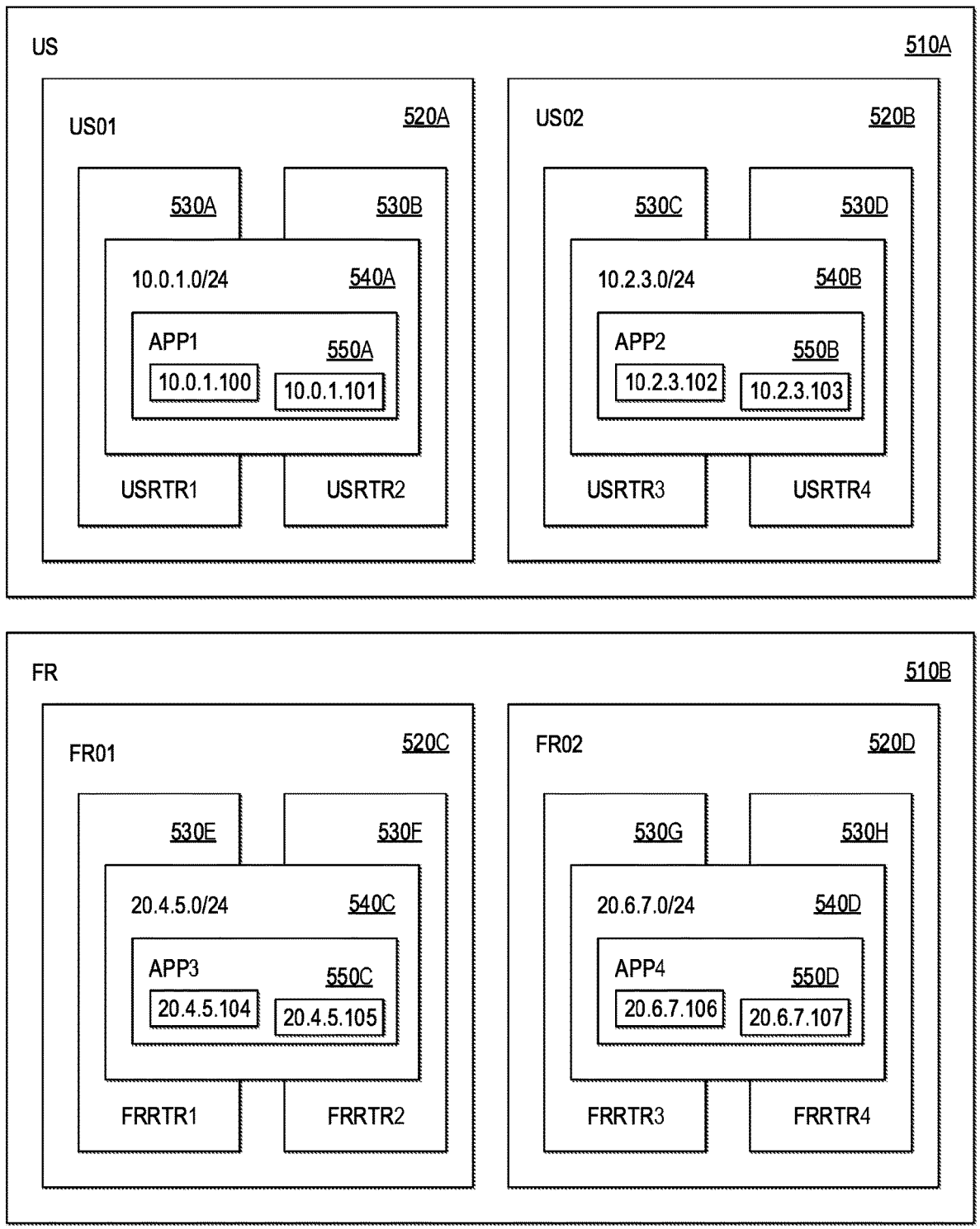
FIG. 5A illustrates a block diagram of an example of a network in accordance with an embodiment.

FIG. 5A illustrates a block diagram of an example of a network 500A. The network 500A can be logically segmented into a United States (US) geographic location 510A and a French (FR) geographic location 510B (collectively, geographic locations 510). Within the geographic locations 510A and 510B, there can be data centers 520A (e.g., US01) and 520B (e.g., US02) and 520C (e.g., FR01) and 520D (e.g., FR02) (collectively, data centers 520), respectively. The data centers 520A, 520B, 520C, and 520D can include network devices 530A (e.g., USRTR1) and 530B (e.g., USRTR1), 530C (e.g., USRTR3) and 530D (e.g., USRTR4), 530E (e.g., FRRTR1) and 530F (e.g., FRRTR2), and 530G (e.g., FRRTR3) and 530H (e.g., FRRTR4) (collectively, network devices 530). The network devices 530A, 530B, and 530C may run Cisco Nexus® Operating System (NXOS) version 6.2.16, and the network devices 530D, 530E, and 530F may run Cisco® NXOS version 8.3.1. The network devices 530A and 530B, 530C and 530D, 530E and 530F, and 530G and 530H may include interfaces for IP prefixes 540A (e.g., 10.0.1.0/24) 540B (e.g., 10.2.3.0/24), 540C (e.g., 20.4.5.0/24), and 540D (e.g., 20.6.7.0/24) (collectively, IP prefixes 540), respectively. The IP prefixes 540A, 540B, 540C, and 540D may be assigned to applications 550A (e.g., APP1), 550B (e.g., APP2), 550C (e.g., APP3), and 550D (e.g., APP4) (collectively, applications 550), respectively. The application 550A may be running on endpoints with IP addresses 10.0.1.100 and 10.0.1.101, the application 550B may be running on endpoints with IP addresses 10.2.3.102 and 10.2.3.103, the application 550C may be running on endpoints with IP addresses 20.4.5.104 and 20.4.5.105, and the application 550D may be running on endpoints with IP addresses 20.6.7.106 and 20.6.7.107.

In some embodiments, the network analytics system can obtain the out-of-band network data or network metadata (e.g., the geographic locations 510, the data centers 520, the network devices 530, the network operating systems, the IP prefixes 540, and the applications 550) from configuration information within the network devices 530. For example, the network 500A may utilize a standardized format for device names, such as AABBCCCC where AA=country identifier and can be used to assign the first segment of a private IP address for the device (e.g., US="10"; FR="20"), BB=data center identifier (e.g., 01, 02), and CCCC=device identifier and can be used to assign the second and third segments of the private IP address for the device (e.g., US01RTR1 and US01RTR2="0.1"; US02RTR3 and US02RTR4="2.3"; FR01RTR1="4.5"; etc.). Alternatively or in addition, the out-of-band network data or network metadata can be obtained from a CMDB/CMS, BMS, BAS, network management system, BMCs, GPS or other location system, network inventory or asset management, and the like. Table 11 sets forth a summary of the out-of-band network data or network metadata of the network 500A.

Figure 5B:
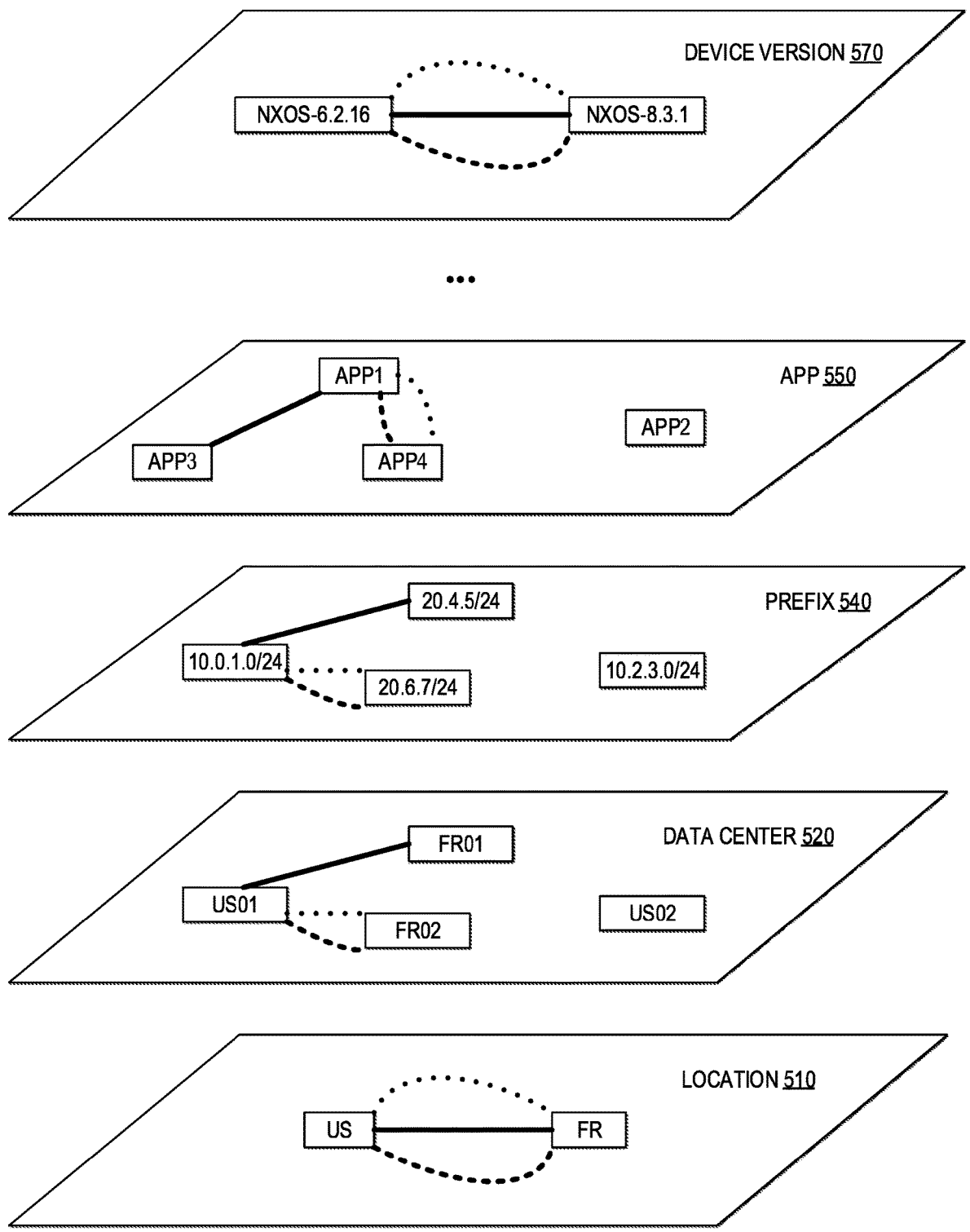
FIG. 5B illustrates an example of a user interface generated from the network of FIG. 5A in accordance with an embodiment.

The network analytics system can use one or more the metadata dimensions of Table 11 to generate each plane. FIG. 5B illustrates an example of a user interface 500B using this approach. For instance, the user interface 500B includes a plane corresponding to the geographic locations 510, a plane corresponding to the data centers 520, a plane corresponding to the IP prefixes 540, a plane corresponding to the applications 550, and a plane corresponding to network device versions 570, and so forth. In some embodiments, the nodes of the plane representing the geographic locations 510 may be positioned on the plane to correspond to the location of the nodes on a world map, national map, state map, city map, campus map, building floor plan, and the like. In some cases, the network analytics system may also draw and display the geographic map or floor plan to further contextualize the enriched flow data.

TABLE 11

Example of Network Metadata

| IP | GEO | DC | DEVICES | DEVICE VERSIONS | PREFIX | APPLICATION |
| --- | --- | --- | --- | --- | --- | --- |
| 10.0.1.100 | US | US01 | US01RTR1, US01RTR2 | NXOS-6.2.16 | 10.0.1.0/24 | APP1 |
| 10.0.1.101 | US | US01 | US01RTR1, US01RTR2 | NXOS-6.2.16 | 10.0.1.0/24 | APP1 |
| 10.2.3.102 | US | US02 | US02RTR3, US02RTR4 | NXOS-6.216, NXOS-8.3.1 | 10.2.3.0/24 | APP2 |
| 10.2.3.103 | US | US02 | US02RTR3, US02RTR4 | NXOS-6.216, NXOS-8.3.1 | 10.2.3.0/24 | APP2 |
| 20.4.5.104 | FR | FR01 | FR01RTR1, FR01RTR2 | NXOS-8.3.1 | 20.4.5.0/24 | APP3 |
| 20.4.5.105 | FR | FR01 | FR01RTR1, FR01RTR2 | NXOS-8.3.1 | 20.4.5.0/24 | APP3 |
| 20.6.7.106 | FR | FR02 | FR02RTR3, FR02RTR4 | NXOS-8.3.1 | 20.6.7.0/24 | APP4 |
| 20.6.7.107 | FR | FR02 | FR02RTR3, FR02RTR4 | NXOS-8.3.1 | 20.6.7.0/24 | APP4 |

At step 408, the network analytics system can generate nodes of graph representations of each plane, such as by extracting unique values for each dimension of the enriched flow data. Here, the network analytics system can generate nodes "US" and "FR" for the plane representing the locations 510; nodes "US1", "U2", "FR1", and "FR2" for the plane representing the data centers 520, nodes "10.0.1.0/24", "10.2.3.0/24", "20.4.5.0/24", and "20.6.7.0/24" for the plane representing the prefixes 540, nodes "NXOS-6.2.16" and "NXOS-8.3.1" for the nodes representing the network operating systems 570. Although each node in this example can represent a single unique value for each dimension, in the network analytics system may use a single node to represent multiple values for a particular dimension or plane at one level of granularity and enable the user to zoom in or magnify a section of a plane to view nodes at a finer level of granularity and/or zoom out or demagnify a section of the plane to view nodes at a coarser level of granularity. In addition, the network analytics system can support pan, tilt, translation, or rotation interactions to enable the user to navigate the plane if the data set is too large to view at a particular level of granularity or to change the perspective of the plane (e.g., plan view or different angles of a perspective view). In some embodiments, the network analytics system may intelligently determine the level of granularity to display and/or the location in a plane to center on, such as based on the user's scope of interest, the size of the data set so as to be comprehensible to the user, correspondence to the level of granularity of a previous plane before the user pivoted to a current plane, the user's progress in an iterative investigative process, and so forth.

At step 410, the network analytics system can generate one or more edges among the multiple nodes based on flow data between endpoints corresponding to the nodes. The flows can be flows actually observed by the network analytics system from historical flow data to enable visualization of a past state of the network, real-time flow data to enable visualization of the "ground truth" state of the network to help understand the various dependencies of the network, or synthetic flow data to enable visualization of the effect of injecting a fault or other simulated event. Table 12 sets forth an example of observed or simulated flows, including a first flow from the endpoint with the IP address 10.0.1.100 to the endpoint corresponding to the endpoint with the IP address 20.6.7.107, a second flow from the endpoint with the IP address 10.0.1.101 to the endpoint corresponding to the endpoint with the IP address 20.4.5.104, and a third flow from the endpoint with the IP address 10.0.1.101 to the endpoint corresponding to the endpoint with the IP address 20.6.7.106. To determine the edges in each plane of the user interface 500B, the network analytics system can join Table 11 and Table 12 based on the IP address in Table 11 and the dimension represented by each plane. In the user interface 500B, the network analytics system may use a dashed line to represent the first flow, a solid line to represent the second flow, and a dotted line to represent the third flow. In this example, some of the planes include nodes with no observed or simulated flows. In other embodiments, the network analytics system may exclude such nodes.

TABLE 12

Example of Observed or Simulated Flows

| ID | Source IP Address | Destination IP Address |
| --- | --- | --- |
| 1 (Dashed Line) | 10.0.1.100 | 20.6.7.107 |
| 2 (Solid Line) | 10.0.1.101 | 20.4.5.104 |
| 3 (Dotted Line) | 10.0.1.101 | 20.6.7.106 |

The process 400 can conclude with step 412 in which the network analytics system can update one or more of the planes in response to an interaction with one of the planes or in response to a query. The network analytics system can support a number of different interactions with the planes of the user interface 500B:

Panning, tilting, rotating, or zooming to view a different portion of one or more planes, such as if there are more flows corresponding to the dimension of the plane than can be displayed on the plane or if the nodes of the graph displayed on the plane can be displayed at a coarser or finer level of granularity. This can also include adjusting the space between planes. The planes may be synchronized such that an interaction with one plane can also be applied to one or more of the other planes or unsynchronized such that an interaction with one plane may only be applied to the selected plane. Whether some or all the planes are synchronized or not may be configurable.

Reordering or shuffling the planes to obtain different views of different dimensions of enriched flow data. This may also include removing or occluding one or more other planes from view Combining planes to view multiple dimensions on a plane to understand inter-dependencies of the combined dimensions, or dividing a plane into multiple planes to isolate one or more dimensions if the plane represents multiple dimensions of enriched flow data or for concurrently viewing different levels of granularity for one or more dimensions.

The network analytics system can also support various modes of inquiry via the user interface 500B:

Pivoting queries to obtain different views of different dimensions of enriched flow data. Pivoting queries may follow queries limiting or filtering flows by certain dimensions (e.g., matching flows to one or more conditions included in the query). For example, a user may desire to understand the impact of upgrading the network operating system. The network operator may begin with a query to the network analytics system to show all flows related to Cisco® NXOS 6.2.16. Then, the operator may transmit a pivoting query to show all relationships between application (e.g., the plane corresponding to the applications 550 and data centers (e.g., the plane corresponding to the data centers 520) for the flows involving Cisco® NXOS 6.2.16.

Iterative queries to progressively change (e.g., expand or contract) the set of flows displayed in the planes representing different dimensions of enriched flow data. For example, the user may attempt to troubleshoot a network fault and use iterative querying to root out the case of the fault by transmitting a first query that produces a first set of flows that match one or more first conditions in the first query and transmitting a second query that produces a second set of flows from among the first set of flows that match one or more second conditions in the second query.

Queries enhancing conventional network debugging tools. The network analytics system can enhance conventional network debugging tools, such as ping or traceroute, by displaying the path of the ping or the traceroute overlaying one or more of the planes of the user interface 500B. This can be a more intuitive way of debugging the network and/or simplify debugging without having to research which networking devices or endpoints to SSH into and what metadata is associated with these devices before running basic network diagnostic commands. For instance, the network analytics system can display the plane corresponding to the data centers 510 as the ground truth flows and a ping can flow between and among US01, FR01, and FR02 to quickly determine whether a particular network fault is due to a failed link between a pair of the data centers.

Fault injection or what-if queries to simulate the effect of a specified network event. Using historical enriched flow data, the network analytics system can simulate traffic in the event of a fault or other change (e.g., change to policy) to the network. The network analytics system can show how traffic would be affected by the fault or network change both intra-dimensionally (e.g., within a plane or for a particular category of flows) and inter-dimensionally (e.g., between planes or across different categories of flows).

Figure 6A:
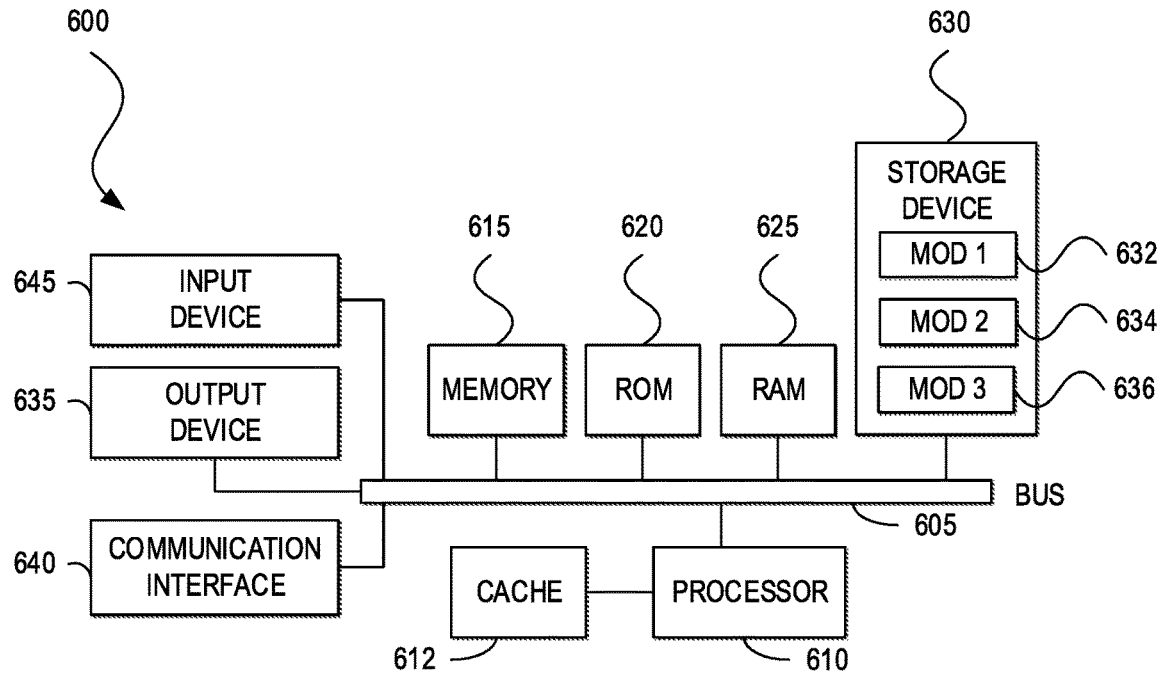
FIG. 6A and FIG. 6B illustrate examples of systems in accordance with some embodiments.
Figure 6B:
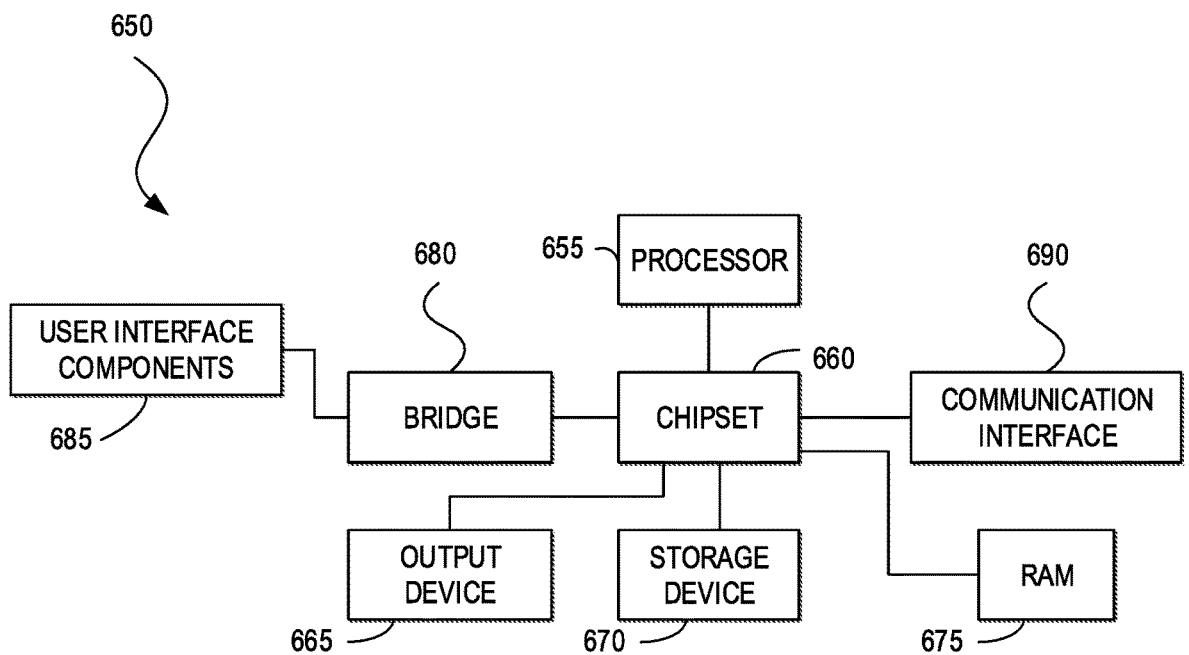

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
    capturing, by a network analytics system, flow data associated with network traffic in a flow data domain and out-of-band network data associated with one or more out-of-band network domains outside of the flow data domain from network elements, the out-of-band network data including contextual information of the network traffic outside of the flow data domain;
    in response to capturing the flow data and out-of-band network data from the network elements, enriching the flow data by in-line association of the flow data and metadata the out-of-band network data, wherein the in-line association of the flow data and the out-of-band network data includes associating the flow data with the contextual information of the network traffic included in the out-of-band network data;
    generating multiple planes each plane representing at least one attribute of the enriched flow data or the flow data;
    generating a graph for each plane of the multiple planes in which nodes of the graph represent different values of the at least one attribute of the enriched flow data or the flow data and lines of the graph represent the flows between endpoints corresponding to the nodes; and
    updating one or more of the planes in response to an input.

2. The computer-implemented method of claim 1, wherein capture of the flow data and the out-of-band network data and the in-line association is performed at least in part by an Application-Specific Integrated Circuit (ASIC) or a Field Programmable Gate Array (FPGA) of a network device.

3. The computer-implemented method of claim 1, further comprising:
    combining multiple dimensions of the enriched flow data during the in-line association using a unary search tree.

4. The computer-implemented method of claim 1, further comprising:
    displaying a geographic map or floor plan on one or more of the planes representing a geographic location; and
    positioning the nodes to overlay the geographic map or the floor plan and to correspond to geographic locations represented by the nodes.

5. The computer-implemented method of claim 1, wherein updating one or more of the planes includes at least one of panning, tilting, rotating, zooming in, zooming out, reordering, shuffling, removing, or occluding at least one plane.

6. The computer-implemented method of claim 5, further comprising:
    synchronizing updates of two or more of the planes.

7. The computer-implemented method of claim 1, wherein updating one or more of the planes includes at least one of combining two or more of the planes into a single plane or dividing at least one of the planes into multiple planes.

8. The computer-implemented method of claim 1, further comprising:
    determining a set of flows that match one or more conditions included in the input;
    displaying the set of flows on a first plane; and
    displaying the set of flows on a second plane in response to receiving a second input requesting to pivot to the second plane.

9. The computer-implemented method of claim 1, further comprising:
    determining a first set of flows that match one or more first conditions included in the input; and
    determining a second set of flows from among the first set of flows that match one or more second conditions included in a second input.

10. The computer-implemented method of claim 1, further comprising:

receiving a ping command or a traceroute command; and displaying a route of the ping command or the traceroute command overlaying one or more graphs of the planes.

11. The computer-implemented method of claim 1, further comprising:

generating synthetic flow data based on historical flow data and a specified network event included in the input.

12. The computer-implemented method of claim 1, further comprising:

extracting the out-of-band network data from a standardized naming format or a standardized addressing scheme for the network elements.

13. A system, comprising:

one or more processors; and memory including instructions that, when executed by the one or more processors, cause the system to:

capture flow data associated with network traffic in a flow data domain and out-of-band network data associated with one or more out-of-band network domains outside of the flow data domain from network elements, the out-of-band network data including contextual information of the network traffic outside of the flow data domain;

in response to capturing the flow data and out-of-band network data from the network elements, enrich the flow data by in-line association of the flow data and the out-of-band network data, wherein the in-line association of the flow data and the out-of-band network data includes associating the flow data with the contextual information of the network traffic included in the out-of-band network data;

generate multiple planes each plane representing at least one attribute of the enriched flow data or the flow data;

generate a graph for each plane of the multiple planes in which nodes of the graph represent different values of the at least one attribute of the enriched flow data or the flow data and lines of the graph represent the flows between endpoints corresponding to the nodes; and update one or more of the planes in response to an input.

14. The system of claim 13, wherein the instructions, when executed, further cause the system to:

display an organizational chart on one or more of the planes representing an organizational attribute; and position the nodes to overlay the organizational chart and to correspond to organizational attributes represented by the nodes.

15. The system of claim 13, wherein the instructions, when executed, further cause the system to:

determine a set of flows that match one or more conditions included in the input;

display the set of flows on a first plane; and display the set of flows on a second plane in response to receiving a second input requesting to pivot to the second plane.

16. The system of claim 13, wherein the instructions, when executed, further cause the system to:

extract the out-of-band network data from a network device configuration.

17. A non-transitory computer-readable storage medium including instructions that, upon being executed by one or more processors of a system, cause the system to:

capture flow data associated with network traffic in a flow data domain and out-of-band network data associated with one or more out-of-band network domains outside of the flow data domain from network elements, the out-of-band network data including contextual information of the network traffic outside of the flow data domain;

in response to capturing the flow data and out-of-band network data from the network elements, enrich the flow data by in-line association of the flow data and the out-of-band network data, wherein the in-line association of the flow data and the out-of-band network data includes associating the flow data with the contextual information of the network traffic included in the out-of-band network data;

generate multiple planes each plane representing at least one attribute of the enriched flow data or flow data;

generate a graph for each plane of the multiple planes in which nodes of the graph represent different values of the at least one attribute of the enriched flow data or the flow data and lines of the graph represent the flows between endpoints corresponding to the nodes; and update one or more of the planes in response to an input.

18. The non-transitory computer-readable storage medium of claim 17, wherein the instructions, when executed, further cause the system to:

display an application dependency map on one or more of the planes representing an attribute of an application or a service; and position the nodes to overlay the application dependency map and to correspond to applications or services represented by the nodes.

19. The non-transitory computer-readable storage medium of claim 17, wherein the instructions, when executed, further cause the system to:

determine a first set of flows that match one or more first conditions included in the input; and determine a second set of flows from among the first set of flows that match one or more second conditions included in a second input.

20. The non-transitory computer-readable storage medium of claim 17, wherein the instructions, when executed, further cause the system to:

extract the out-of-band network data from one of a Configuration Management Database (CMDB), a Configuration Management System (CMS), a Building Management System (BMS), a Building Automation System (BAS), a centralized network management system, a Baseboard Management Controller (BMC), a Global Positioning System (GPS), a location system, or a network inventory system.

* * * * *